US009783894B2

(12) United States Patent
Zhang et al.

(10) Patent No.: US 9,783,894 B2
(45) Date of Patent: Oct. 10, 2017

(54) METAL COMPOSITE AND METHOD OF PREPARING THE SAME, METAL-RESIN COMPOSITE AND METHOD OF PREPARING THE SAME

(71) Applicant: BYD COMPANY LIMITED, Shenzhen, Guangdong (CN)

(72) Inventors: Xiao Zhang, Guangdong (CN); Lili Tang, Guangdong (CN); Yun Cheng, Guangdong (CN); Qiang Guo, Guangdong (CN); Liang Chen, Guangdong (CN)

(73) Assignee: BYD COMPANY LIMITED, Shenzhen (CN)

( * ) Notice: Subject to any disclaimer, the term of this patent is extended or adjusted under 35 U.S.C. 154(b) by 112 days.

(21) Appl. No.: 14/554,370

(22) Filed: Nov. 26, 2014

(65) Prior Publication Data
US 2015/0079384 A1  Mar. 19, 2015

Related U.S. Application Data

(63) Continuation of application No. PCT/CN2013/076351, filed on May 28, 2013.

(30) Foreign Application Priority Data

May 28, 2012 (CN) .......................... 2012 1 0167744
May 28, 2012 (CN) .......................... 2012 1 0167745
May 28, 2012 (CN) .......................... 2012 1 0167814

(51) Int. Cl.
C23F 1/20        (2006.01)
B32B 15/08       (2006.01)
C25D 11/16       (2006.01)
C25D 11/18       (2006.01)
C25D 11/24       (2006.01)
C23C 26/00       (2006.01)
B32B 15/20       (2006.01)
B29C 45/14       (2006.01)
B29K 705/02      (2006.01)

(52) U.S. Cl.
CPC .......... *C23F 1/20* (2013.01); *B29C 45/14311* (2013.01); *B32B 15/08* (2013.01); *B32B 15/20* (2013.01); *C23C 26/00* (2013.01); *C25D 11/16* (2013.01); *C25D 11/18* (2013.01); *C25D 11/24* (2013.01); *B29K 2705/02* (2013.01); *B32B 2605/00* (2013.01); *Y10T 428/24997* (2015.04)

(58) Field of Classification Search
None
See application file for complete search history.

(56) References Cited

U.S. PATENT DOCUMENTS 4,154,705 A   5/1979  Baldi et al.
4,499,237 A   2/1985  Tracke
4,687,551 A   8/1987  Furneaux et al.
5,021,504 A   6/1991  Fujita
5,332,780 A   7/1994  Kitazawa et al.
5,602,200 A   2/1997  Wissmann
6,804,081 B2  10/2004 Den et al.
7,841,577 B2  11/2010 Yamaguchi et al.
7,879,734 B2  2/2011  Fukutani et al.
8,703,272 B2  4/2014  Naritomi et al.
2001/0036559 A1  11/2001 Haack et al.
2002/0033108 A1  3/2002  Akiyama et al.
2002/0040888 A1  4/2002  Marczak et al.
2003/0001274 A1  1/2003  Den et al.
2003/0180555 A1  9/2003  Wakayama et al.
2004/0013931 A1  1/2004  Takamura et al.
2004/0062943 A1  4/2004  Naritomi et al.
2004/0142503 A1  7/2004  Lee et al.
2004/0229031 A1  11/2004 Gell et al.
2006/0054589 A1  3/2006  Omori et al.
2006/0055084 A1  3/2006  Yamaguchi et al.
2006/0088680 A1  4/2006  Kitahara (Continued)

FOREIGN PATENT DOCUMENTS

CN  1190062 A  8/1998
CN  1492804 A  4/2004

(Continued)

OTHER PUBLICATIONS

Furneaux et al., "The Formation of Controlled-porosity Membranes from Anodically Oxidized Aluminum," Nature, vol. 337, No. 6203, Jan. 12, 1989, pp. 147-149.

Gong et al., "Electrochemical/chemical Synthesis of Nanostructured Arrays of Oxide Cones or Rings," Journal of Materials Chemistry. vol. 18, No. 15, Mar. 12, 2008, pp. 1741-1746.

Lee et al., "NanostructureDependent WaterDroplet Adhesiveness Change in Superhydrophobic Anodic Aluminum Oxide Surfaces: From Highly Adhesive to Self-Cleanable," Langmuir Letter, vol. 26, No. 3, Feb. 2, 2010, pp. 1412-1415, including Supporting Information, Dec. 29, 2009.

Extended European Search Report dated Sep. 25, 2015, issued in related European Patent Application No. EP12869418.9 (7 pages).

(Continued)

Primary Examiner — Shamim Ahmed

(57) ABSTRACT

A metal composite, a method of preparing the metal composite, a metal-resin composite, and a method of preparing the metal-resin composite are provided. The metal composite comprises: a metal substrate comprising a first layer formed on a surface of the metal substrate and an anodic oxidation layer formed on the first layer. The first layer comprises a first pore having an average diameter of about 10 nanometers to about 1 millimeter, and the metal composite comprises aluminum alloy or aluminum. The anodic oxidation layer comprises a second layer contacted with the first layer of the metal substrate and a third layer formed on an outer surface of the second layer, and the second layer comprises a second pore having an average diameter of about 10 nanometers to about 800 microns, and the third layer comprises a third pore having an average diameter of about 10 nanometers to about 800 microns.

18 Claims, 2 Drawing Sheets

(56) References Cited

U.S. PATENT DOCUMENTS

| | | |
|---|---|---|
| 2006/0127684 A1 | 6/2006 | Naritomi et al. |
| 2006/0257624 A1 | 11/2006 | Naritomi et al. |
| 2007/0096359 A1 | 5/2007 | Torfs |
| 2007/0116934 A1 | 5/2007 | Miller |
| 2007/0196637 A1 | 8/2007 | Good et al. |
| 2008/0057336 A1 | 3/2008 | Kurokawa et al. |
| 2008/0081867 A1 | 4/2008 | Sakata et al. |
| 2008/0102404 A1 | 5/2008 | Tashiro et al. |
| 2009/0017242 A1 | 1/2009 | Weber et al. |
| 2009/0075156 A1 | 3/2009 | Long et al. |
| 2009/0155522 A1 | 6/2009 | Raghavendran |
| 2009/0202840 A1 | 8/2009 | Griebel et al. |
| 2009/0274889 A1 | 11/2009 | Iwahashi et al. |
| 2009/0280296 A1 | 11/2009 | Naritomi et al. |
| 2009/0304970 A1 | 12/2009 | Imaizumi et al. |
| 2010/0018025 A1 | 1/2010 | Naritomi et al. |
| 2010/0021718 A1 | 1/2010 | Vos et al. |
| 2010/0028602 A1 | 2/2010 | Naritomi et al. |
| 2010/0177392 A1 | 7/2010 | Masuda et al. |
| 2010/0189958 A1 | 7/2010 | Naritomi et al. |
| 2010/0190029 A1 | 7/2010 | Ueki |
| 2010/0215965 A1* | 8/2010 | Tadaki ............ B32B 15/08 428/418 |
| 2010/0218827 A1 | 9/2010 | Aono et al. |
| 2010/0255732 A1 | 10/2010 | Kohmura et al. |
| 2010/0283165 A1 | 11/2010 | Ihara |
| 2010/0304083 A1 | 12/2010 | Naritomi et al. |
| 2010/0316878 A1 | 12/2010 | Naritomi et al. |
| 2011/0008644 A1 | 1/2011 | Naritomi et al. |
| 2011/0111214 A1 | 5/2011 | Endo et al. |
| 2011/0165342 A1 | 7/2011 | Imai et al. |
| 2011/0250377 A1 | 10/2011 | Qin |
| 2011/0281135 A1 | 11/2011 | Gong et al. |
| 2011/0297549 A1 | 12/2011 | Chen et al. |
| 2011/0300400 A1* | 12/2011 | Tomita ............. B22F 1/0025 428/605 |
| 2011/0305893 A1 | 12/2011 | Chang et al. |
| 2011/0318585 A1 | 12/2011 | Su et al. |
| 2012/0015186 A1 | 1/2012 | Honma et al. |
| 2012/0039066 A1 | 2/2012 | Hatanaka et al. |
| 2012/0043689 A1 | 2/2012 | Chang et al. |
| 2012/0094108 A1 | 4/2012 | Chang et al. |
| 2012/0168990 A1 | 7/2012 | Kuwahara et al. |
| 2012/0213971 A1 | 8/2012 | Ihara |
| 2012/0237755 A1 | 9/2012 | Chang et al. |
| 2013/0043689 A1 | 2/2013 | Tai et al. |
| 2013/0078423 A1 | 3/2013 | Sutou et al. |
| 2013/0242487 A1 | 9/2013 | Fujioka et al. |
| 2014/0360974 A1 | 12/2014 | Sun et al. |
| 2014/0363623 A1 | 12/2014 | Sun et al. |
| 2014/0363631 A1 | 12/2014 | Gong et al. |
| 2014/0363657 A1 | 12/2014 | Gong et al. |
| 2014/0363658 A1 | 12/2014 | Sun et al. |
| 2014/0363659 A1 | 12/2014 | Sun et al. |
| 2014/0363660 A1 | 12/2014 | Gong et al. |
| 2014/0363686 A1 | 12/2014 | Sun et al. |

FOREIGN PATENT DOCUMENTS

| | | |
|---|---|---|
| CN | 1639387 A | 7/2005 |
| CN | 1706992 A | 12/2005 |
| CN | 1711170 A | 12/2005 |
| CN | 1717323 A | 1/2006 |
| CN | 101010452 A | 8/2007 |
| CN | 101248219 A | 8/2008 |
| CN | 101313087 A | 11/2008 |
| CN | 101341023 A | 1/2009 |
| CN | 101396888 A | 4/2009 |
| CN | 101409229 A | 4/2009 |
| CN | 101547779 A | 9/2009 |
| CN | 101568420 A | 10/2009 |
| CN | 101578170 A | 11/2009 |
| CN | 101607446 A | 12/2009 |
| CN | 101623933 A | 1/2010 |
| CN | 101640169 A | 2/2010 |
| CN | 101687390 A | 3/2010 |
| CN | 101743111 A | 6/2010 |
| CN | 101795845 A | 8/2010 |
| CN | 101802263 A | 8/2010 |
| CN | 101875251 A | 11/2010 |
| CN | 101913065 A | 12/2010 |
| CN | 101937935 A | 1/2011 |
| CN | 101941271 A | 1/2011 |
| CN | 101988609 A | 3/2011 |
| CN | 102021569 A | 4/2011 |
| CN | 102039700 A | 5/2011 |
| CN | 102056724 A | 5/2011 |
| CN | 102229266 A | 11/2011 |
| CN | 102234803 A | 11/2011 |
| CN | 102268183 A | 12/2011 |
| CN | 102345127 A | 2/2012 |
| CN | 102371679 A | 3/2012 |
| CN | 102441962 A | 5/2012 |
| CN | 102442028 A | 5/2012 |
| CN | 102666921 A | 9/2012 |
| CN | 102776466 A | 11/2012 |
| CN | 103036086 A | 4/2013 |
| EP | 1643546 A2 | 4/2006 |
| EP | 1958763 A1 | 8/2008 |
| EP | 2031099 A1 | 3/2009 |
| EP | 2154203 A1 | 2/2010 |
| EP | 2221398 A1 | 8/2010 |
| EP | 2426237 A1 | 3/2012 |
| JP | S50-39759 A | 4/1975 |
| JP | S59211576 A | 11/1984 |
| JP | 61-106796 A | 5/1986 |
| JP | H06272085 A | 9/1994 |
| JP | 2000144491 A | 5/2000 |
| JP | 2001254009 A | 5/2000 |
| JP | 2001-315159 A | 11/2001 |
| JP | 2002225164 A | 8/2002 |
| JP | 2004-055248 A | 2/2004 |
| JP | 2004249681 A | 9/2004 |
| JP | 2005342895 A | 12/2005 |
| JP | 2006001216 A | 1/2006 |
| JP | 2006027018 A | 2/2006 |
| JP | 2007050630 A | 3/2007 |
| JP | 2007203585 A | 8/2007 |
| JP | 2008091933 A | 4/2008 |
| JP | 2008095132 A | 4/2008 |
| JP | 2006124827 A | 5/2008 |
| JP | 2008138288 A | 6/2008 |
| JP | 2008156381 A | 7/2008 |
| JP | 2008243412 A | 10/2008 |
| JP | 2009041008 A | 2/2009 |
| JP | 2009267334 A | 11/2009 |
| JP | 2010000679 A | 1/2010 |
| JP | 2010030177 A | 2/2010 |
| JP | 2010-064496 A | 3/2010 |
| JP | 2010110931 A | 5/2010 |
| JP | 2011021260 A | 2/2011 |
| JP | 2011168017 A | 9/2011 |
| JP | 2011174133 A | 9/2011 |
| JP | 2011194594 A | 10/2011 |
| JP | 2011218603 A | 11/2011 |
| JP | 2012006392 A | 1/2012 |
| JP | 2012193448 A | 10/2012 |
| KR | 20060104540 A | 10/2006 |
| KR | 20080062814 A | 7/2008 |
| KR | 20090027317 A | 3/2009 |
| KR | 20090089852 A | 8/2009 |
| WO | 0138444 A1 | 5/2001 |
| WO | 2004048087 A1 | 6/2004 |
| WO | WO 2005/109984 A2 | 11/2005 |
| WO | 2007066742 A1 | 6/2007 |
| WO | 2009078377 A1 | 6/2009 |
| WO | 2010073636 A1 | 7/2010 |
| WO | 2011055757 A1 | 5/2011 |
| WO | 2011071102 A1 | 6/2011 |
| WO | 2011123790 A1 | 10/2011 |
| WO | 2013123754 A1 | 8/2013 |
| WO | 2013123756 A1 | 8/2013 |
| WO | 2013123769 A1 | 8/2013 |

(56) References Cited

FOREIGN PATENT DOCUMENTS

| WO | 2013123770 A1 | 8/2013 |
|----|---------------|--------|
| WO | 2013123771 A1 | 8/2013 |
| WO | 2013123772 A1 | 8/2013 |
| WO | 2013123773 A1 | 8/2013 |
| WO | 2013123898 A1 | 8/2013 |
| WO | 2013148476 | 10/2013 |
| WO | WO 2013/178057 A1 | 12/2013 |
| WO | 2014101778 | 7/2014 |

OTHER PUBLICATIONS

Extended European Search Report dated Sep. 25, 2015, issued in related European Patent Application No. EP12869214.2 (6 pages).
PCT International Preliminary Report on Patentability dated Aug. 26, 2014, issued in related International Application No. PCT/CN2012/078830 (5 pages).
PCT International Preliminary Report on Patentability dated Aug. 26, 2014, issued in related International Application No. PCT/CN2012/078832 (5 pages).
PCT International Preliminary Report on Patentability dated Aug. 26, 2014, issued in related International Application No. PCT/CN2012/082029 (5 pages).
PCT International Preliminary Report on Patentability dated Aug. 26, 2014, issued in related International Application No. PCT/CN2012/082043 (5 pages).
PCT International Preliminary Report on Patentability dated Aug. 26, 2014, issued in related International Application No. PCT/CN2013/071797 (7 pages).
PCT International Preliminary Report on Patentability dated Aug. 26, 2014. issued in related International Application No. PCT/CN2012/082031 (5 pages}.
PCT International Preliminary Report on Patentability dated Aug. 26, 2014, issued in related International Application No. PCT/CN2012/082025 (5 pages).
PCT International Search Report and Written Opinion dated Mar. 27, 2014, issued in related International Application No. PCT/CN2013/090471 (13 pages).
PCT International Search Report dated Dec. 13, 2012, issued in International Application No. PCT/CN2012/078832 (4 pages).
PCT International Search Report dated Jan. 10, 2013, issued in International Application No. PCT/CN2012/082043 (4 pages).
PCT International Search Report dated Jan. 3, 2013, issued in International Application No. PCT/CN2012/082029 (4 pages).
PCT International Search Report dated Jan. 3, 2013, issued in International Application No. PCT/CN2012/082025 (4 pages).
PCT International Search Report dated Jan. 3, 2013, issued in International Application No. PCT/CN2012/082031 (4 pages).
PCT International Search Report dated Jan. 3, 2013, issued in International Application No. PCT/CN2012/082036 (4 pages).
PCT International Search Report dated May 30, 2013, issued in International Application No. PCT/CN2013/071797 (4 pages).
PCT International Search Report dated Nov. 29, 2012, issued in International Application No. PCT/CN2012/078830 (4 pages).
Non-Final Office Action dated May 24, 2016, issued in related U.S. Appl. No. 14/466,906 (11 pages).
Non-Final Office Action dated Feb. 18, 2016, issued in related U.S. Appl. No. 14/466,927 (15 pages).
Non-Final Office Action dated Apr. 8, 2016, issued in related U.S. Appl. No. 14/466,932 (9 pages).
Final Office Action dated Jun. 20, 2016, issued in related U.S. Appl. No. 14/466,932 (10 pages).
Non-Final Office Action dated Sep. 20, 2016, issued in related U.S. Appl. No. 14/466,932 (17 pages).
Non-Final Office Action dated Aug. 3, 2016, issued in related U.S. Appl. No. 14/466,937 (14 pages).
Non-Final Office Action for U.S. Appl. No. 14/466,853, mailed on Sep. 30, 2016 (12 pages).
Non-Final Office Action for U.S. Appl. No. 14/466,363, mailed on Oct. 18, 2016 (12 pages).
PCT International Search Report and Written Opinion dated Sep. 5, 2013, issued in corresponding International Application No. PCT/CN2013/076351 (12 pages).
Non-Final Office Action for U.S. Appl. No. 14/723,344, dated Jun. 8, 2017, 15 pages.
Final Office Action for U.S. Appl. No. 14/466,927, dated Jul. 17, 2017, 21 pages.

\* cited by examiner

METAL COMPOSITE AND METHOD OF PREPARING THE SAME, METAL-RESIN COMPOSITE AND METHOD OF PREPARING THE SAME

CROSS-REFERENCE TO RELATED APPLICATIONS

This application is a continuation of International Application No. PCT/CN2013/076351, filed on May 28, 2013, which claims priority to and benefits of Chinese Patent Application No. 201210167745.8, Chinese Patent Application No. 201210167814.5, and Chinese Patent Application No. 201210167744.3, all filed with the State Intellectual Property Office of P. R. China on May 28, 2012, the entire contents of all of which are incorporated herein by reference in their entireties.

FIELD

The present disclosure relates to a metal composite and methods of preparing the metal composite, and a metal-resin composite and methods of preparing the metal-resin composite, and more particularly to a metal composite that has three porous layers and methods of preparing the metal composite, and a metal-resin composite comprising the metal composite and methods of preparing the metal-resin composite.

BACKGROUND

The statements in this section merely provide background information related to the present disclosure and may not constitute prior art.

In the field of vehicles, household electrical appliances, industrial machines and so on, there is an actual requirement for integrating a metal with a resin composition. Currently, a composite of the metal and resin compositions is normally formed with an adhesion agent at room temperature or under a heating condition. However, metal-resin composites formed with the adhesion agent may have a poor adhesion force between the metal and resin compositions. In addition, a subsequent surface treatment such as anodic oxidation may damage the metal-resin composites, because the adhesion agent between the metal and resin compositions has poor acid and alkali resistance.

SUMMARY

This summary is provided to introduce a selection of concepts in a simplified form that are further described below in the DETAILED DESCRIPTION. This summary is not intended to identify key features or essential features of the claimed subject matter, nor is it intended to be used as an aid in determining the scope of the claimed subject matter.

The present disclosure seeks to solve at least one of the problems existing in the art to at least some extent. To this end, a first aspect of the present disclosure provides a metal composite. The metal composite may comprise: a metal substrate comprising a first layer formed on a surface of the metal substrate, and the first layer may comprise at least one first pore having an average diameter ranging from about 10 nanometers to about 1 millimeter, and the metal composite may comprise aluminum alloy or aluminum; and an anodic oxidation layer formed on the first layer of the metal substrate, and the anodic oxidation layer may comprise a second layer contacted with the first layer of the metal substrate and a third layer formed on an outer surface of the second layer, and the second layer may comprise at least one second pore having an average diameter ranging from about 10 nanometers to about 800 microns, and the third layer may comprise at least one third pore having an average diameter ranging from about 10 nanometers to about 800 microns.

A second aspect of the present disclosure provides a method of preparing a metal composite. The method may comprise: providing a metal substrate comprising an anodic oxidation layer on a surface thereof, the metal substrate may comprise a first layer, the anodic oxidation layer may comprise a second layer contacted with the first layer and a third layer formed on the second layer, the third layer may comprise at least one third pore, and the metal substrate may comprise aluminum alloy or aluminum; and immersing the metal substrate in an etching solution to form at least one first pore in the first layer and to form at least one second pore in the second layer. In some embodiments, the etching solution may comprise $H^+$. In some embodiments, the $H^+$ may have a concentration ranging from about 0.55 mol/L to about 5.5 mol/L. In some embodiments, the etching solution may comprise $H^+$, $Cl^-$, and/or $PO_4^{3-}$.

A third aspect of the resent disclosure provides a metal-resin composite. The metal-resin composite may comprise: a metal composite described herein, and a resin layer comprising a resin composition filled in the first, second, and third pores.

A fourth aspect of the resent disclosure provides a method of preparing the metal-resin composite described herein. The method may comprise: injection molding a resin composition and the metal composite described herein to form a resin layer on a surface of the metal composite.

With the method of preparing the metal composite described herein, a unique three-dimensional pore structure comprising three porous layers may be formed on a surface of a metal substrate. A resin composition may be injected into the pores of the porous layers directly to form a metal-resin composite having a better adhesion force between the metal and the resin, without an exothermic reaction generated by additional groups or particular requirements on the resin compositions. Thus, the metal-resin composite described herein has wider applications.

Moreover, with the method of preparing the metal composite described herein, the three-dimensional pore structure may have larger pores in the bottom (for example, near the metal surface, such as the surface of the aluminum of the aluminum alloy) and smaller pores in the top (such as in the third layer).

As described herein, the metal substrate may have three layers: the first layer, such as, e.g., a corrosion layer; the second layer, such as, e.g., an etching buffering layer; and the third layer, such as, e.g., a surface porous layer having the third pore. In some embodiments, the etching solution comprising $H^+$, $Cl^-$, and/or $PO_4^{3-}$ may enter the third pore of the third layer, come into contact with the second layer and corrode the second layer to form the second pore, and come into contact with the first layer and corrode the first layer to form the first pore.

Because the corrosion solution may corrode the metal (such as, e.g., aluminum or aluminum alloy contained in the metal substrate) with a higher speed, and corrode the oxidation layer (such as, e.g., a natural anodic oxidation layer, or the second layer) with a lower speed, i.e. the speed of forming the first layer is higher than that of forming the second layer, the first pore formed in the first layer may have a larger average diameter. Thus, the three-dimensional pore structure having larger pores in the bottom and smaller pores in the top may be formed.

In addition, the second layer may act as a barrier to partially prevent the etch solution from corroding the first layer directly, thus reducing etching of the surface and slowing down corrosion of the first layer, and therefore an intense reaction due to a direct corrosion to the first layer by the etching solution may be avoided. Thereby, the disadvantages of the intense reaction, such as intense heat release and rapid temperature increase, may be avoided.

According to some embodiments of the present disclosure, the appearance of the metal substrate (such as, e.g., a metal substrate comprising alloy or alloy aluminum) may show no obvious changes, heat release during the etching process may be less, and the speed of temperature increase during the etching process may be low, which may be suitable for large scale production. Also, the consumption of the etch solution may be less, and the etching solution may cause less corrosion to applied devices.

According to some embodiments of the present disclosure, the third layer may comprises at least one third pore, and the third pore may have a unique structure which may form good adhesion with the resin composition. In addition, because the etch solution may have a smaller influence on the anodic oxidation layer (including the second layer and the third layer) but a greater influence on the first layer, and because the three-dimensional pore structure having larger pores in the bottom and smaller pores in the top may be formed on the metal substrate, the adhesion force between the metal (e.g., the metal substrate, such as, e.g., a metal substrate comprising aluminum or aluminum alloy) and the resin may be further improved.

According to some embodiments of the present disclosure, the contact between the metal substrate and the resin composition may be tight and strong. The etching process in the methods described herein may have little influence on the shape of the metal substrate and cause less heat release. There may be no particular limitations for the resin composition, no harmful gases generated during the production process, and no pollution to the environment, making the metal-resin composite suitable for wider applications.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of the disclosure will become apparent and more readily appreciated from the following descriptions made with reference the accompanying drawings, in which.

DETAILED DESCRIPTION

Figure 1:
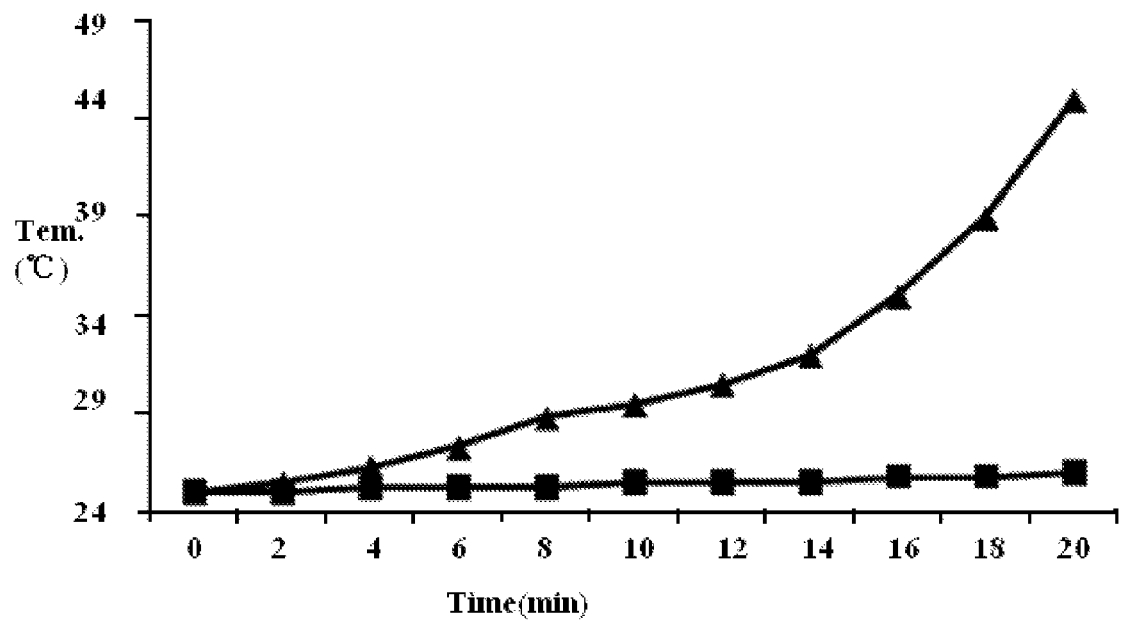
FIG. 1 is a diagram showing temperature changes of the etching solution of example 8 according to an embodiment of the present disclosure and comparative example 3.

Reference will be made in detail to embodiments of the present disclosure; samples of described embodiments are indicated in the drawings. The embodiments described herein with reference to drawings are explanatory, illustrative, and used to generally understand the present disclosure. The embodiments shall not be construed to limit the present disclosure.

According to a first aspect of the present disclosure, a metal composite is provided. The metal composite may comprises: a metal substrate comprising a first layer formed on a surface of the metal substrate, wherein the first layer may comprise at least one first pore having an average diameter ranging from about 10 nanometers to about 1 millimeter, and the metal composite may comprise aluminum alloy or aluminum; and an anodic oxidation layer formed on the first layer of the metal substrate, wherein the anodic oxidation layer may comprise at least one second layer contacted with the first layer of the metal substrate and a third layer formed on an outer surface of the second layer, and the second layer may comprise at least one second pore having an average diameter ranging from about 10 nanometers to about 800 microns, and the third layer may comprise at least one third pore having an average diameter ranging from about 10 nanometers to about 800 microns.

In some embodiments, the metal substrate may be made of aluminum or aluminum alloy. The aluminum or aluminum alloy may have a better adhesion force with a resin composition; and the production process of the aluminum or aluminum alloy may be simple and may cause no pollution, which is suitable for large scale production.

In some embodiments, the third pore may have an average diameter ranging from about 10 nanometers to about 500 microns; the second pore may have an average diameter ranging from about 10 nanometers to about 500 microns; and the first pore may have an average diameter ranging from about 10 nanometers to about 800 microns. In some embodiments, the third pore may have an average diameter ranging from about 10 nanometers to about 100 microns; the second pore may have an average diameter ranging from about 10 nanometers to about 200 microns; the first pore may have an average diameter ranging from about 10 nanometers to about 600 microns. Thus the three-dimensional pore structure comprising three porous layers may be further optimized, further facilitating the resin composition to be injected directly into the pores and form an adhesive contact with the metal substrate.

In some embodiments, the third layer may have a thickness ranging from about 100 nanometers to about 100 microns, such as, e.g., about 1 micron to about 50 microns. In some embodiments, the second layer may have a thickness ranging from about 50 nanometers to about 5 microns, such as, e.g., about 50 nanometers to about 500 nanometers. Thus the anodic oxidation layer may have a higher adhesion force with the metal substrate, and the space for corroding the pore structure may be further optimized, so as to create a corrosion pore (such as the first, second, and third pore) with a better structure on the surface of the metal substrate.

In some embodiments, the first layer may have a thickness ranging from about 10 nanometers to about 200 microns, such as, e.g., about 10 nanometers to about 100 microns. There may be no obvious boundary between the first layer and the metal substrate, and the thickness of the first layer may correspond to the depth of the first pore. With the first pores formed on the first layer, the adhesion force between the resin composition and the metal composite may be improved without damaging the performance of the metal substrate. In addition, the surface structure of the metal substrate may be optimized, and the filled area of the molten resin composition on the surface of the metal composite may be increased, thus ensuring that any resin composition could be fully filled into these pores (the first, second, and third pore) during a common injection molding process. Further, the contact area between the resin composition and the metal composite may not be reduced, and there may be no gap between these pores, thus further increasing the adhesion force between the resin composition and the metal composite.

In some embodiments, the first pore, the second pore, and the third pore may be communicated with each other to optimize the three-dimensional pore structure comprising three porous layers, which further facilitates the resin composition to permeate into these pores, improves the adhesion force between the metal (such as the metal substrate or the metal composite) and the resin composition, and facilitates the following injection molding.

According to a second aspect of the present disclosure, a method of preparing a metal composite is provided. The method may comprise: providing a metal substrate having an anodic oxidation layer on a surface thereof, wherein the metal substrate may comprise a first layer, the anodic oxidation layer may comprise a second layer contacted with the first layer and a third layer formed on the second layer, the third layer may comprise at least one third pore, and the metal substrate may comprise aluminum alloy or aluminum; and immersing the metal substrate in an etching solution to form at least one first pore in the first layer and to form at least one second pore in the second layer. In some embodiments, the etching solution may comprise H+. In some embodiments, the $H^+$ may have a concentration ranging from about 0.55 mol/L to about 5.5 mol/L.

In some embodiments, the etching solution may further comprise $Cl^-$, and/or $PO_4^{3-}$.

In some embodiments, providing the metal substrate having the anodic oxidation layer may be performed by an anodic oxidation method. The anodic oxidation method may be any anodic oxidation method known in the art. In some embodiments, the anodic oxidation method may comprise: immersing the metal substrate in a sulfuric acid solution having a concentration ranging from about 10 wt % to about 30 wt % and anodizing the metal substrate at a temperature ranging from about 10 Celsius degrees to about 30 Celsius degrees, under a voltage ranging from about 10 Volts to about 100 Volts, preferably under a voltage ranging from about 10 Volts to about 20 Volts, for about 1 minute to about 40 minutes to obtain the metal substrate having the anodic oxidation layer on the surface thereof. In some embodiments, the anodic oxidation layer may have a thickness ranging from about 1 micron to about 20 microns.

In some embodiments, the anodic oxidation method may comprise: immersing the metal substrate in a phosphoric acid solution having a concentration ranging from about 10 wt % to about 30 wt % and anodizing the metal body for about 2 minutes to about 15 minutes under a voltage ranging from about 5 Volts to about 35 Volts and a temperature ranging from about 10 Celsius degrees to about 30 Celsius degrees.

In some embodiments, the anodic oxidation method may use any device commonly used in the art, such as, e.g., an anodic oxidation tank.

With the method described herein, the acid etching solution may corrode the metal substrate having an anodic oxidation layer to form first pores having a large average diameter on the surface of the metal substrate under the anodic oxidation layer. With the first pores, during subsequent molding processes, the resin composition can penetrate into these pores and form a resin layer having excellent adhesion with the metal substrate.

In some embodiments, the etching solution may comprise H+, $Cl^-$ (chloridion), and/or $PO_4^{3-}$ (phosphate anion). In some embodiments, the $H^+$ may have a concentration ranging from about 0.55 mol/L to about 5.5 mol/L. In some embodiments, the etching solution may comprise a single acid, for example, a hydrochloric acid solution or a phosphoric acid solution. The single acid solution may corrode the metal substrate to form first pores uniformly distributed on the metal substrate and having uniform sizes, thus improving the adhesion between the metal composite and the resin composition, the tension resistance of the metal-resin composite, and the integrated contact between the metal composite and the resin composition. In some embodiments, based on the weight of the hydrochloric acid solution, the hydrochloric acid may have a concentration ranging from about 2 wt % to about 20 wt %, such as, e.g., about 5 wt % to about 18 wt %, or about 5 wt % to about 15 wt %. In some embodiments, based on the weight of the phosphoric acid solution, the phosphoric acid may have a concentration ranging from about 3 wt % to about 40 wt %, such as, e.g., about 5 wt % to about 30 wt %, or about 5 wt % to about 20 wt %.

In some embodiments, the phosphoric acid solution may further comprise an inorganic substance containing a halogen. In this way, the corrosion speed (such as the speed for forming the pores) may be increased, the operation time of etching may be reduced, and the structure of these pores (the three-dimensional pore structure comprising three porous layers) may be optimized. In some embodiments, the inorganic substance may comprise a soluble hydrochloride. Chloridions generated by the hydrochloride may easily cause point-corrosion on the surface of the metal substrate under an acidic condition, thus making it easy to create more pores on the surface of the metal substrate, and deepening and widening the original pores (such as the third pore). The soluble hydrochloride may be any kind used in the art, provided that the hydrochloride does not react with the phosphoric acid, such as reacting with the phosphoric acid to form precipitates or to emit gases, without particular limitations. In some embodiments, the soluble hydrochloride may comprise at least one selected from the group consisting of sodium chloride, potassium chloride, and aluminum chloride. In some embodiments, based on the weight of the phosphoric acid solution, the soluble hydrochloride may have a concentration ranging from about 0.01 wt % to about 10 wt %.

In some embodiments, the etching solution may comprise a solution mixture, for example, a mixture of soluble acid solution and a soluble salt solution. In one embodiment, the etching solution may comprise an aqueous solution mixture of hydrochloric acid and a chloride. In some embodiments, based on the weight of the aqueous solution mixture, the hydrochloric acid may have a concentration ranging from about 2 wt % to about 20 wt %, and the chloride may have a concentration ranging from about 1 wt % to about 20 wt %. In some embodiments, the etching solution may comprise an aqueous solution mixture of phosphoric acid and a phosphate. In some embodiments, based on the weight of the aqueous solution mixture, the phosphoric acid may have a concentration ranging from about 3 wt % to about 30 wt %, and the phosphate may have a concentration ranging from about 1 wt % to about 20 wt %.

According to some embodiments of the present disclosure, immersing the metal substrate into the etching solution may be performed with any method known in the art, such as completely immersing or partly immersing, multi-plate immersing or single-plate immersing, without particular limitations. In some embodiments, immersing the metal substrate into the etching solution may be carried out at a temperature ranging from about 18 Celsius degrees to about 35 Celsius degrees, such as, e.g., about 20 Celsius degrees to about 30 Celsius degrees, for about 1 minute to about 60 minutes, such as, e.g., about 1 minute to about 30 minutes, thus optimizing the thickness of the first layer and the structure of the first pore.

According to some embodiments of the present disclosure, immersing the metal substrate into the etching solution may be carried out for more than one time, such as, e.g., for 2 times to 10 times, each time for about 1 minute to about 10 minutes. In some embodiments, after immersing the metal substrate into the etching solution, the metal substrate may be washed, e.g., with deionized water. In some embodiments of the present disclosure, the metal substrate may be placed in a rinsing bath and washed for about 1 minute to about 5 minutes, or placed in the rinsing bath for about 1 minute to about 5 minutes.

According to some embodiments of the present disclosure, the anodic oxidation layer may comprise a second layer contacted with the first layer and a third layer formed on the second layer. In some embodiments, the third layer may be formed on one surface which is opposite to the surface where the first layer is formed. In some embodiments, the third layer may have a thickness ranging from about 100 nanometers to about 100 microns, such as, e.g., about 1 micron to about 80 microns, about 1 micron to about 50 microns, or about 1 micron to about 30 microns. In some embodiments, the second layer may have a thickness ranging from about 5 nanometers to about 5 microns, such as, e.g., about 10 nanometers to about 1 microns, about 50 nanometers to about 500 nanometers, or about 50 nanometers to about 300 nanometers.

In some embodiments, the third layer may comprise at least one third pore. In some embodiments, the third pore may have an average diameter ranging from about 10 nanometers to about 800 microns, such as, e.g., 10 nanometers to about 500 microns, or about 100 nanometers to about 200 microns. In some embodiments, the second layer may comprise at least one second pore. In some embodiments, the second pore has an average diameter ranging from about 10 nanometers to about 800 microns, such as, e.g., about 10 nanometers to about 500 microns, or about 15 nanometers to about 200 microns.

According to some embodiments of the present disclosure, the metal substrate may comprise a first layer contacted with the anodic oxidation layer (such as, e.g., the second layer of the anodic oxidation layer). In some embodiments, the first layer may have a thickness ranging from about 5 nanometers to about 200 microns, such as, e.g., about 10 nanometers to about 200 microns, or about 10 nanometers to about 100 microns.

In some embodiments, there may be no obvious boundary between the first layer and the metal substrate, and the thickness of the first layer may correspond to a depth of the first pore. The first layer may comprise at least one first pore. In some embodiments, the first pore may have an average diameter ranging from about 10 nanometers to about 1 mm, such as, e.g., about 20 nanometers to about 800 microns.

According to some embodiments of the present disclosure, the method of preparing the metal composite may further comprise a step of pretreatment prior to immersing the metal substrate in the sulfuric acid solution. The pretreatment may be any pretreating process known in the art.

In some embodiments, the pretreatment may comprise the steps of: polishing the metal substrate to remove obvious foreign matters on the surface of the metal substrate; removing oils adhered on the metal substrate; and washing the metal substrate. In some embodiments, the pretreatment may comprise: polishing, removing oil, first water-washing, alkali etching, second water-washing, neutralization, and third water-washing. For example, the pretreatment may comprise polishing the surface of the metal substrate with a 100-400 mesh sand paper or a polishing machine to form pores with a micron scale on the surface of the metal substrate; washing the metal substrate with a solvent for about 0.5 hours to about 2 hours to remove oil adhered on the surface of the metal substrate; and placing the metal substrate in an acid/alkaline solution and washing with ultrasonic. In some embodiments, the solvent may comprise ethyl alcohol or acetone. The acid/alkaline solution may be any acid/alkaline solution known in the art, such as, e.g., hydrochloric acid, sulfuric acid, sodium hydroxide, potassium hydroxide, etc. In one embodiment, the pretreatment may comprise: removing oils on the surface of the metal substrate with an absolute ethyl alcohol; washing and drying the metal substrate; immersing the metal substrate in a sodium hydroxide aqueous solution having a concentration ranging from about 30 g/L to about 70 g/L and a temperature ranging from about 40 Celsius degrees to about 80 Celsius degrees for about 1 minute to about 5 minutes to remove oils; washing the metal substrate with deionized water; performing a neutralization step with a $HNO_3$ solution having a concentration ranging from about 10% to about 30% in a neutralizing tank to remove residual alkaline solution on the surface of the metal substrate; and washing with deionized water. In some embodiments, the obtained metal substrate may comprise micron scale pore(s) on the surface. In some embodiments, the micron scale pore may have an average diameter ranging from about 1 micron to about 10 millimeters, such as, e.g., 1 micron to about 10 microns.

In some embodiments of the present disclosure, the metal substrate may be selected from the group consisting of aluminum substrate and aluminum alloy substrate, without particular limitations. In one embodiment, the aluminum alloy substrate can be made of aluminum alloy series 1000-7000, or an aluminum alloy which can be molded. And there are no particular limitations for the shape and structure of the aluminum alloy substrate. The aluminum alloy substrate may have any common shape and structure known in the art. In some embodiments, the shape and the structure of the aluminum alloy substrate can be achieved by machining.

According to a third aspect of the present disclosure, a metal-resin composite is provided. The metal-resin composite may comprise: a metal composite described herein; and a resin layer comprising a resin composition filled in the first, second, and third pores.

In some embodiments, the metal-resin composite may further comprise a water-soluble polymer filled in the first, second, or third pore of the metal composite, or provided on the surface of the metal composite. In some embodiments, the metal composite may be immersed in a water-soluble polymer solution, and the water-soluble polymer may be absorbed on the metal substrate (such as, e.g., in the pores or on the surface of the metal substrate) and stay thereon after been dried, so as to modify the oleophilic property of the metal composite. Because the water-soluble polymer is an organic material having excellent compatibility with the resin composition, the speed of the following injection molding of the metal substrate and the resin composition may be increased.

With the water-soluble polymer according to some embodiments of the present disclosure, the oleophilic property of the metal composite may be modified to facilitate the resin composition to fill in the pores, thereby the adhesion force between the metal substrate and the resin composition may be improved, and the production efficiency may be increased.

In some embodiments, the water-soluble polymer may be formed on the surface of the metal substrate.

In some embodiments, the water-soluble polymer may be filled in the pores of the metal substrate. For example, the water-soluble polymer may be filled in the third pore and/or the second pore and/or the first pore. In an embodiment of the present disclosure, the water-soluble polymer may be filled in the third pore, the second pore, and the first pore. In some embodiments, the water-soluble polymer may enter the unique pore structure (the three-dimensional pore structure having three porous layers) of the metal composite and fill in the pores to remove air in the pore, thus efficiently preventing the formation of a gap in the contact portion between the metal composite and the resin composition formed during the following injection molding due to the presence of residual air. Therefore the adhesion force and the performance of the metal-resin composite may be improved.

According to some embodiments of the present disclosure, there are no limitations for the water-soluble polymer, and the water-soluble polymer can be any common water-soluble polymer known in the art.

In some embodiments, the water-soluble polymer may comprise at least one selected from the group consisting of polyvinyl alcohol, polyethylene glycol, polyacrylic acid, polyacrylate, polymethylacrylic acid, polymethacrylate, polyethylene sulfonic acid, polyethylene sulfonate, polystyrene sulfonic acid, and polystyrene sulfonate.

According to some embodiments of the present disclosure, there are no limitations for the resin composition. The resin composition can be any resin composition which can form a metal-resin composite with a metal plate or metal substrate. The resin composition can be selected according to practical requirements. In an embodiment, the resin composition may comprise a thermoplastic resin.

In some embodiments, the resin composition may comprise a thermoplastic resin, such as nylon. In some embodiments, the thermoplastic resin may comprise a matrix resin and a polyolefin resin. In some embodiments, the thermoplastic resin may comprise a blend of the matrix resin and the polyolefin resin. In some embodiments, the matrix resin may comprise a non-crystalline resin. With the non-crystalline resin having higher surface gloss and toughness than prior high crystalline resins, associated with the polyolefin resin having a melting point ranging from about 65 Celsius degrees to about 105 Celsius degrees, the injection molding may not need to be carried out under a specified mold temperature. Thus the molding process may be simplified, and the metal-resin composite obtained may have a better mechanical strength and surface treatment characteristics. In that way, the requirements for surface decoration for plastic elements may be met.

Further, by way of using the resin composition comprising the non-crystallize resin (matrix resin) and the polyolefin resin having a melting point ranging from about 65 Celsius degrees to about 105 Celsius degrees, it facilitates the resin composition to flow into the nano-scale pores (the first, second, and third pores) of the resin composition, thus the metal-resin composite obtained may have an excellent adhesion force and a better mechanical strength between the resin layer and the metal composite. In one embodiment of the present disclosure, based on 100 weight parts of the thermoplastic resin, the thermoplastic resin may comprise about 70 weight parts to about 95 weight parts of the matrix resin and about 5 weight parts to about 30 weight parts of the polyolefin resin.

In some embodiments, the thermoplastic resin may comprise a fluidity modifier. In some embodiments, based on 100 weight parts of the thermoplastic resin, the thermoplastic resin may comprise about 1 weight part to about 5 weight parts of the fluidity modifier. In some embodiments, the fluidity modifier may comprise a ring polyester. In some embodiments, with the fluidity modifier, the fluidity of the thermoplastic resin may be improved to facilitate the following injection molding step, and thus the adhesion force between the resin composition and the metal substrate may be improved accordingly.

According to some embodiments of the present disclosure, the matrix resin may comprise a non-crystalline resin. In some embodiments, the matrix resin may comprise polycarbonate (PC), and any linear chain PC or branch chain PC may be used in the matrix resin, without particular limitations. In some embodiments, the matrix resin may comprise a mixture of polyphenylene oxide (PPO) and polyphenylene sulfide (PPS), such as, e.g., with a weight ratio of the PPO to the PPS ranging from 3:1 to 1:3, or 2:1 to 1:1. In some embodiments, the matrix resin may comprise a mixture of PPO and polyamide (PA), such as, e.g., with a weight ratio of the PPO to the PA ranging from 3:1 to 1:3, or 2:1 to 1:1.

According to some embodiments of the present disclosure, the polyolefin resin may have a melting point ranging from about 65 Celsius degrees to about 105 Celsius degrees. In some embodiments, the polyolefin resin may comprise a grafted polyethylene. In some embodiments, the grafted polyethylene may have a melting point ranging from about 100 Celsius degrees to about 105 Celsius degrees.

According to some embodiments of the present disclosure, the resin composition may comprise other additives. The additives may be selected depending on practical requirements, without particular limitations. For example, the resin composition may comprise a filler. The filler can be any common filler known in the art, such as, e.g., a fiber filler or an inorganic powder filler. In some embodiment, the fiber filler may comprise at least one selected from the group consisting of glass fiber, carbon fiber, and polyamide fiber. In some embodiment, the inorganic powder filler may comprise at least one selected from the group consisting of silicon dioxide, talcum powder, aluminum hydroxide, magnesium hydroxide, calcium carbonate, magnesium carbonate, heavy barium sulfate, glass, and kaolin. In some embodiments, the matrix resin may comprise about 50 weight parts to about 150 weight parts of the fiber filler and about 50 weight parts to about 150 weight parts of the inorganic powder filler, based on 100 weight parts of the matrix resin. Thus the resin composition may have a linear expansion coefficient in the lateral and longitudinal directions similar to that of the metal composite.

According to a fourth aspect of the present disclosure, a method of preparing the metal-resin composite is provided. The method of preparing the metal-resin composite may comprise: injection molding a resin composition and the metal composite described herein to form a resin layer on a surface of the metal composite. For example, the metal composite may be placed in a mould, and then a resin composition may be injected in the mould and integrated with the metal composite.

According to some embodiments of present disclosure, the resin composition may comprise a matrix resin and a polyolefin resin. In some embodiments, the resin composition may be formed by mixing or blending the matrix resin and the polyolefin resin. The method of forming the resin composition may be any method known in the art, for example, the matrix resin may be mixed with the polyolefin resin uniformly to form a resin mixture, and then the resin mixture may be extruded by a double-screw extruder to form the resin composition.

The method of preparing a metal-resin composite according to some embodiments of the present disclosure, may further comprise adding a filler or a fluidity modifier into the resin composition, such as, e.g., into the matrix resin of the resin composition. With the addition of the filler and the fluidity modifier, the resin composition may obtain a linear expansion coefficient in the lateral and longitudinal directions similar to that of the metal substrate.

According to some embodiments of present disclosure, the method may further comprise a step of modification treatment, for example, surface modification treatment prior to the injection molding step. In some embodiments, the modification treatment may comprise immersing the metal composite in a water-soluble polymer solution prior to the injection molding step.

According to some embodiments of the present disclosure, the metal composite may be immersed into a water-soluble polymer solution, and the water-soluble polymer may be absorbed on the metal substrate and stay on the metal substrate after dried, so as to modify the metal composite. In some embodiments, the water-soluble polymer may be an organic having excellent compatibility with the resin composition. The water-soluble polymer may improve the oleophilic property of the metal composite, thus facilitating the resin composition to fill in the pores (first, second, and third pores) more easily, accelerating the injection speed, increasing the adhesion force between the metal composite and the resin composition, and improving the product yield finally. Further, The water-soluble polymer may enter the unique pore structure (three-dimensional pore structure having three porous layers) and remove air in these pores effectively, and thus the resin composition may completely fill in these pores and form the resin layer on the metal composite with stronger adhesion therebetween.

In some embodiments, the modifying step (such as, e.g., the immersing) may be carried out at a temperature ranging from about 15 Celsius degrees to about 60 Celsius degrees, such as, e.g., about 20 Celsius degrees to about 40 Celsius degrees, for about 1 minute to about 30 minutes, or about 5 minutes to about 20 minutes. In some embodiments, based on the total weight of the water soluble polymer solution, the water-soluble polymer may have a concentration ranging from about 1 wt % to about 20 wt %.

According to some embodiments of the present disclosure, the dried metal composite may be placed in the mould, and then the metal composite may be integrated with the resin composition to form the metal-resin composite. Any methods which can make the metal composite and the resin composition integrated may be applied in the present disclosure, the method is not limited to the injection molding.

Those with ordinary skill in the art will appreciate that, injection molding the metal composite and the resin composition to form the metal-resin composite is one embodiment of the present disclosure, and any other integration method may be applied to form the metal-resin composite without departing from the scope of the disclosure. In some embodiments, the injection molding step may be carried out under a condition of: a mould temperature ranging from about 50 Celsius degrees to about 300 Celsius degrees, a nozzle temperature ranging from about 200 Celsius degrees to about 450 Celsius degrees, a pressure maintaining time ranging from about 1 second to about 50 seconds, an injection pressure ranging from about 50 MPa to about 300 MPa, an injection time ranging from about 1 second to about 30 seconds, a time delay ranging from about 1 second to about 30 seconds, and a cooling time ranging from about 1 second to about 60 seconds. In some embodiments, the injection molding step may be carried out under a condition of: a mold temperature ranging from about 80 Celsius degrees to about 200 Celsius degrees, a nozzle temperature ranging from about 200 Celsius degrees to about 350 Celsius degrees, a pressure maintaining time ranging from about 1 second to about 10 seconds, an injection pressure ranging from about 90 MPa to about 140 MPa, an injection time ranging from about 3 seconds to about 10 seconds, a time delay ranging from about 15 seconds to about 30 seconds, and a cooling time ranging from about 15 seconds to about 25 seconds. In some embodiments, the resin composition may have a weight ranging from about 1 g to about 100 g. In some embodiments, the obtained resin layer may have a thickness ranging from about 0.5 millimeters to about 10 millimeters.

With the method of preparing the metal-resin composite according to embodiments of present disclosure, the production process may be simplified, and the production time for the metal-rein composite may be shortened, and there are no limitations for the type of the resin composition. In addition, with the method of preparing the metal composite described herein, the etching time for the metal substrate may be substantially shortened. The metal-resin composite described herein may have a better adhesion force between the resin composition and the metal composite, and a better tensile shear strength.

The metal-resin composite described herein may be used directly, or may be subjected to some treatments, such as CNC machining or plating so as to be used in other applications according to practical requirements.

The disclosure will be further described below by way of examples.

Example 1

The method of preparing a metal-resin composite comprised the following steps:
1) Pretreatment A commercially available aluminum alloy substrate (series 6063) having a thickness of 1 mm was cut into 15 mm*80 mm rectangular pieces. Then these pieces of aluminum alloy substrate were polished with a polishing machine. After being polished, these pieces of aluminum alloy substrate were washed to remove oil. Then, these pieces of aluminum alloy substrate were etched in a sodium hydroxide solution having a concentration of 40 g/L and a temperature of 60 Celsius degrees for 10 seconds, and then removed from the sodium hydroxide solution and washed with water. These washed pieces of aluminum alloy substrate were immersed in a 6 wt % $HNO_3$ solution for 30 seconds in a neutralizing tank, and then removed from the $HNO_3$ solution and washed with water.

2) Surface Treatment 1

These pieces of aluminum alloy substrate after the step 1) were immersed in a $H_2SO_4$ solution having a concentration of 20 wt % for 5 minutes under a voltage of 15 Volts and a temperature of 18 Celsius degrees in an anodic oxidation tank, and then removed from the $H_2SO_4$ solution and dried at a temperature of 80 Celsius degrees for 20 minutes.

3) Surface Treatment 2

A 500 milliliters etching solution which comprises 5 wt % of hydrochloric acid and 10 wt % of sodium chloride was prepared in a beaker. The etching solution was heated to 25 Celsius degrees in a thermostatic bath.

Then 10 pieces of aluminum alloy substrate after the step 2) were immersed in the etching solution for 2 minutes, and then removed from the etching solution and immersed in water contained in a beaker for 2 minutes as a cycle. Then the cycle was repeated for 5 times. After the finally immersing in water, these pieces of aluminum alloy substrate were dried at 80 Celsius degrees in a drying oven.

These pieces of aluminum alloy substrate after the step 3) were tested with a metallographic microscope. The results indicated that the aluminum alloy substrate were formed with a third layer having a thickness ranging from about 6.5 microns to about 7.5 microns, a second layer having a thickness ranging from about 80 nanometers to about 100 nanometers, and a first layer having a thickness ranging from about 20 nanometers to about 35 microns.

These pieces of aluminum alloy substrate after the step 3) were tested with a field emission scanning electron microscope. The results indicated that the third layer had third pores having an average diameter ranging from about 15 nanometers to about 800 nanometers, the second layer had second pores having an average diameter ranging from about 15 nanometers to about 600 nanometers, and the first layer had first pores having an average diameter ranging from about 40 nanometers to about 80 microns. And a unique three-dimensional pore structure having three porous layers was observed, and the first pore, the second pore, and the third pore were communicated with each other.

4) Molding

These pieces of aluminum alloy substrate after the step 3) were divided into two groups, each group including 5 pieces. The two groups were inserted into moulds respectively, with one group injected molding with a PPS rein composition (comprising 30 wt % of glass fiber) and the other group injected with nylon. Then the two groups were both removed from the moulds, and cooled, obtaining a metal-resin composite group A1 and a metal-resin composite group B1.

Example 2

The method for preparing a metal-resin composite of Example 2 comprised substantially the same steps as Example 1 with the following differences: in the step 3), a 500 milliliters etching solution comprising 5 wt % of hydrochloric acid and 10 wt % of sodium chloride was prepared in a beaker, the etching solution was heated to 25 Celsius degrees in a thermostatic bath, then 10 pieces of aluminum alloy substrate after the step 2) were immersed in the etching solution for 10 minutes, and then removed from the etching solution and immersed in a beaker containing water for 2 minutes, and then these pieces of aluminum alloy substrate were dried in a drying oven at 80 Celsius degrees. A metal-resin composite group A2 and a metal-resin composite group B2 were obtained.

The results indicated that the aluminum alloy substrate was formed with a third layer having a thickness ranging from about 6 microns to about 7 microns, a second layer having a thickness ranging from about 85 nanometers to about 100 nanometers and a first layer having a thickness ranging from about 20 nanometers to about 40 microns. And the third layer had third pores having an average diameter ranging from about 15 nanometers to about 1 micron, the second layer had second pores having an average diameter ranging from about 16 nanometers to about 800 nanometers, and the first layer had first pores having an average diameter ranging from about 40 nanometers to about 90 microns. And a unique three-dimensional pore structure having three porous layers was observed, and the first pore, the second pore, and the third pore were communicated with each other.

Example 3

The method for preparing a metal-resin composite of Example 3 comprised substantially the same steps as Example 1 with the following differences: in the step 3), a 500 milliliters etching solution comprising 10 wt % of phosphoric acid was prepared in a beaker, the etching solution was heated to 25 Celsius degrees in a thermostatic bath, then 10 pieces of aluminum alloy substrate after the step 2) were immersed in the etching solution for 2 minutes as a cycle, then the cycle was repeated for 2 times, after the final immersing in the beaker containing water for 2 minutes, these pieces of aluminum alloy substrate were dried at 80 Celsius degrees in a drying oven. A metal-resin composite group A3 and a metal-resin composite group B3 were obtained.

The results indicated that the aluminum alloy substrate was formed with a third layer having a thickness ranging from about 6 microns to about 6.5 microns, a second layer having a thickness ranging from about 80 nanometers to about 110 nanometers and a first layer having a thickness ranging from about 20 nanometers to about 40 microns. And the third layer had third pores having an average diameter ranging from about 20 nanometers to about 1 micron, the second layer had second pores having an average diameter ranging from about 18 nanometers to about 800 nanometers and the first layer had first pores having an average diameter ranging from about 50 nanometers to about 120 microns. And a unique three-dimensional pore structure having three porous layers was observed, and the first pore, the second pore, and the third pore were communicated with each other.

Example 4

The method for preparing a metal-resin composite of Example 4 comprised substantially the same steps as Example 1 with the following differences: in the step 3), a 500 milliliters etching solution comprising 10 wt % of hydrochloric acid was prepared in a beaker, the etching solution was heated to 25 Celsius degrees in a thermostatic bath, then 10 pieces of aluminum alloy substrate after the step 2) were immersed in the etching solution for 2 minutes as a cycle, then the cycle was repeated for 5 times, and then removed from the etching solution and immersed in a beaker containing water for 2 minutes, after the final immersing in the beaker containing water for 2 minutes, these pieces of aluminum alloy substrate were immersed at 80 Celsius degrees in a drying oven. A metal-resin composite group A4 and a metal-resin composite group B4 were obtained.

The results indicated that the aluminum alloy substrate was formed with a third layer having a thickness ranging from about 6 microns to about 7 microns, a second layer having a thickness ranging from about 80 nanometers to about 100 nanometers and a first layer having a thickness ranging from about 100 nanometers to about 30 microns. And the third layer had third pores having an average diameter ranging from about 15 nanometers to about 30 microns, the second layer had second pores having an average diameter ranging from about 20 nanometers to about 800 nanometers and the first layer comprises at least one first pore having an average diameter ranging from about 60 nanometers to about 100 microns. And a unique three-dimensional pore structure having three porous layers was observed, and the first pore, the second pore, and the third pore were communicated with each other.

Example 5

The method for preparing a metal-resin composite of Example 5 comprised substantially the same steps as Example 1 with the following difference: in the step 3), each time these 10 pieces of aluminum alloy substrate after the step 2) were immersed in the etching solution for 3 minutes. A metal-resin composite group A5 and a metal-resin composite group B5 were obtained.

The results indicated that the aluminum alloy substrate was formed with a third layer having a thickness ranging from about 5 microns to about 6 microns, a second layer having a thickness ranging from about 80 nanometers to about 100 nanometers and a first layer having a thickness ranging from about 80 nanometers to about 50 microns. And the third layer had third pores having an average diameter ranging from about 20 nanometers to about 65 microns, the second layer had second pores having an average diameter ranging from about 25 nanometers to about 2 microns and the first layer had first pores having an average diameter ranging from about 50 nanometers to about 300 microns. And a unique three-dimensional pore structure having three porous layers was observed, and the first pore, the second pore, and the third pore were communicated with each other.

Example 6

The method for preparing a metal-resin composite of Example 6 comprised substantially the same steps as Example 1 with the following difference: in the step 3), the etching solution was hydrochloric acid having a concentration of 15 wt %. A metal-resin composite group A6 and a metal-resin composite group B6 were obtained.

The results indicated that the aluminum alloy substrate was formed with a third layer having a thickness ranging from about 4.5 microns to about 5.5 microns, a second layer having a thickness ranging from about 80 nanometers to about 100 nanometers and a first layer having a thickness ranging from about 100 nanometers to about 60 microns. And the third layer had third pores having an average diameter ranging from about 20 nanometers to about 70 microns; the second layer had second pores having an average diameter ranging from about 30 nanometers to about 3 microns and the first layer had first pores having an average diameter ranging from about 50 nanometers to about 400 microns. And a unique three-dimensional pore structure having three porous layers was observed, and the first pore, the second pore, and the third pore were communicated with each other.

Example 7

The method for preparing a metal-resin composite of Example 7 comprised substantially the same steps as Example 1 with the following differences: prior to the step 4) and after the step 3), these pieces of aluminum alloy substrate were immersed in a 2 wt % polyvinyl alcohol solution for 5 minutes, and then removed from polyvinyl alcohol solution and dried. A metal-resin composite group A7 and a metal-resin composite group B7 were obtained.

Example 8

1) Pretreatment

A commercially available aluminum alloy substrate (series 6063) having a thickness of 1 mm was cut into 15 mm*80 mm rectangular pieces. Then these pieces of aluminum alloy substrate were polished with a polishing machine. After being polished, these pieces of aluminum alloy substrate were washed to remove oil. Then, these pieces of aluminum alloy substrate were etched in a sodium hydroxide solution having a concentration of 40 g/L at 60 Celsius degrees for 10 seconds, and then removed from the sodium hydroxide solution and washed with water. Then these washed pieces of aluminum alloy substrate were immersed in a 6 wt % $HNO_3$ solution for 30 seconds in a neutralizing tank, and then removed from the $HNO_3$ solution and washed with water.

2) Surface Treatment 1

These pieces of aluminum alloy substrate after the step 1) were immersed in a $H_2SO_4$ solution having a concentration of 20 wt % for 5 minutes under a voltage of 20 Volts and a temperature of 18 Celsius degrees in an anodic oxidation tank, and then removed from the $H_2SO_4$ solution and dried at a temperature of 80 Celsius degrees for 20 minutes.

3) Surface Treatment 2

A 500 milliliters etching solution which comprises 5 wt % of hydrochloric acid and 10 wt % of sodium chloride was prepared in a beaker to act as an etching solution. The etching solution was heated to 25 Celsius degrees in a thermostatic bath, and a thermometer was placed in the thermostatic bath, with a measuring point of the thermometer located in the middle of the etching solution. Then 20 pieces of aluminum alloy substrate after the step 2) were divided into two groups, each group including 10 pieces. The first group of these aluminum alloy substrates was immersed in the etching solution for 2 minutes, and then removed from the etching solution and immersing the first group in water. Before the first group was removed from the etching solution, a temperature of the etching solution was recorded. Then the second group of these aluminum alloy substrates was immersed immediately in the etching solution for 2 minutes. Before the second group was removed from the etching solution, a temperature of the etching solution was recorded. After the second group was removed from the etching solution, the second group was immersed in water. As mentioned above, the process of immersing the first group in the etching solution, removing the first group from the etching solution and immersing the first group in water, immersing the second group in the etching solution, removing the second group from the etching solution, and immersing the second group in water was considered as a cycle. The cycle was repeated for 5 times, each time before these aluminum alloy substrates were removed from the etching solution, the temperature of the etching solution was recorded. The result was shown in the diagram of FIG. 1, which indicates the temperature changes of the etching solution with time.

Comparative Example 1

1) Pretreatment

A commercially available aluminum alloy substrate (series 6063) having a thickness of 1 mm was cut into 15 mm*80 mm rectangular pieces. Then these pieces of aluminum alloy substrate were polished in a polishing machine. After being polished, these pieces of aluminum alloy substrate were washed to remove oil. Then, these pieces of aluminum alloy substrate were etched in a sodium hydroxide solution having a concentration of 40 g/L and a temperature of 60 Celsius degrees for 10 seconds, and then removed from the sodium hydroxide solution and washed with water. Then these cleaned pieces of aluminum alloy substrate were immersed in a 6 wt % $HNO_3$ solution for 30 seconds in a neutralizing tank, and then removed from the $HNO_3$ solution and washed with water.

2) Surface Treatment

A 500 milliliters hydrochloric acid solution having a concentration of 10 wt % was prepared in a beaker. The hydrochloric acid solution was heated to 25 Celsius degrees in a thermostatic bath. Then 10 pieces of aluminum alloy substrate after the step 1) were immersed in the hydrochloric acid solution for 2 minutes, and then removed from the hydrochloric acid solution and immersed in a beaker containing water for 2 minutes as a cycle. Then the cycle was repeated for 5 times. After the final immersing in the beaker containing water for 2 minutes, these pieces of aluminum alloy substrate were dried in a drying oven at 80 Celsius degrees.

These pieces of aluminum alloy substrate after the step 2) were tested with a metallographic microscope. The results indicated that the aluminum alloy substrate was formed with a first layer having a thickness ranging from about 500 nanometers to about 100 microns.

These pieces of aluminum alloy substrate after the step 2) were tested with a field emission scanning electron microscope. The results indicated that the first layer had first pores having an average diameter ranging from about 500 nanometers to about 500 microns.

3) Molding

These pieces of aluminum alloy substrate after the step 2) were divided into two groups, each group comprising 5 pieces. The two groups were inserted in an injection mould, with one group injected with a PPS comprising 30 wt % of glass fiber, while the other group injected with nylon. Then the two groups were demoded and cooled, obtaining a metal-resin composite group C1 and a metal-resin composite group D1.

Comparative Example 2

1) Pretreatment

A commercially available aluminum alloy substrate (series 6063) which has a thickness of 1 mm was cut into 15 mm*80 mm rectangular pieces. Then these pieces of aluminum alloy substrate were polished with a polishing machine. After being polished, these pieces of aluminum alloy substrate were washed to remove oil. Then, these pieces of aluminum alloy substrate were etched in a sodium hydroxide solution having a concentration of 40 g/L and a temperature of 60 Celsius degrees for 10 seconds and then removed from the sodium hydroxide solution and washed with water. Then these cleaned pieces of aluminum alloy substrate were immersed in a 6 wt % $HNO_3$ solution for 30 seconds in a neutralizing tank, and then removed from the $HNO_3$ solution and washed with water.

2) Surface Treatment

These pieces of aluminum alloy substrate after the step 1) were immersed in a $H_2SO_4$ solution having a concentration of 20 wt % for 5 minutes under a voltage of 15 Volts in an anodic oxidation tank, and then removed from the $H_2SO_4$ solution and blown to dry these aluminum alloy substrates.

These pieces of aluminum alloy substrate after the step 2) were tested with a metallographic microscope. The results indicated that the aluminum alloy substrate was formed with a first layer having a thickness ranging from about 9 microns to about 10 microns.

These pieces of aluminum alloy substrate after the step 2) were tested with a field emission scanning electron microscope. The results indicated that the first layer had first pores having an average diameter ranging from about 10 nanometers to about 100 nanometers.

3) Molding

These pieces of aluminum alloy substrate after the step 2) were divided into two groups, each group comprising 5 pieces. The two groups were inserted in an injection mould, with one group injected with a PPS resin composition comprising 30 wt % of glass fiber, while the other group injected with nylon. Then the two groups were demoded and cooled, obtaining a metal-resin composite group C2 and a metal-resin composite group D2.

Comparative Example 3

1) Pretreatment

A commercially available aluminum alloy substrate (series 6063) which has a thickness of 1 mm was cut into 15 mm*80 mm rectangular pieces. Then these pieces of aluminum alloy substrate were polished with a polishing machine. After being polished, these pieces of aluminum alloy substrate were washed. Then, these pieces of aluminum alloy substrate were etched in a sodium hydroxide solution having a concentration of 40 g/L and a temperature of 60 Celsius degrees for 10 seconds and then removed from the sodium hydroxide solution and washed with water. Then these washed pieces of aluminum alloy substrate were immersed in a 6 wt % $HNO_3$ solution for 30 second in a neutralizing tank, and then removed from the $HNO_3$ solution and washed with water.

2) Surface Treatment

A 500 milliliters etching solution which comprises 5 wt % of hydrochloric acid and 10 wt % of sodium chloride was prepared in a beaker to act as an etching solution. The etching solution was heated to 25 Celsius degrees in a thermostatic bath, and a thermometer was placed in the thermostatic bath with a measuring point of the thermometer located in middle of the etching solution. Then 20 pieces of aluminum alloy substrate after the step 1) were divided into two groups, each group comprising 10 pieces. The first group of these aluminum alloy substrates was immersed in the etching solution for 2 minutes, and then removed from the etching solution and immersed in water. Before the first group was removed from the etching solution, the temperature of the etching solution was recorded. Then the second group of these aluminum alloy substrates was immediately immersed in the etching solution for 2 minutes. Then the second group was removed from the etching solution. Before the second group was removed from the etching solution, the temperature of the etching solution was recorded. Then the second group was immersed in a beaker containing water. The process of immersing the first group in the etching solution, removing the first group from the etching solution and immersing the first group in water, immersing the second group in the etching solution, removing the second group from the etching solution, and immersing the second group in the water was considered as a cycle. The cycle was repeated for 5 times, each time before the aluminum alloy substrate was removed from the etching solution the temperature of the etching solution was recorded. The results were shown in FIG. 1.

Performance Test

These metal-resin composite groups A1-A7 and C1 and C2 were tested with a universal material testing machine. The maximum load of the test results were considered as an adhesion force between the aluminum alloy and the resin. The test results were shown in Table 2.

TABLE 1

|  | Thickness of third layer | Average pore diameter of third pore | Thickness of second layer | Average pore diameter of second pore | Thickness of first layer | Average pore diameter of first pore |
|---|---|---|---|---|---|---|
| Example 1 | 6.5-7.5 um | 15-800 nm | 80-100 nm | 15-600 nm | 20 nm-35 um | 40 nm-80 um |
| Example 2 | 6-7 um | 15 nm-1 um | 85-100 nm | 16-800 nm | 20 nm-40 um | 40 nm-90 um |
| Example 3 | 6-6.5 um | 20 nm-1 um | 80-110 nm | 18-800 nm | 20 nm-40 um | 50 nm-120 um |
| Example 4 | 6-7 um | 15 nm-30 um | 80-100 nm | 20-800 nm | 100 nm-30 um | 60 nm-100 um |
| Example 5 | 5-6 um | 20 nm-65 um | 80-100 nm | 25 nm-2 um | 80 nm-50 um | 50 nm-300 um |
| Example 6 | 4.5-5.5 um | 20 nm-70 um | 80-100 nm | 30 nm-3 um | 100 nm-60 um | 50 nm-400 um |

TABLE 2

| Example | Adhesion force/N | Example | Adhesion force/N |
|---|---|---|---|
| A1 | 810.57 | B1 | 783.26 |
| A2 | 763.96 | B2 | 739.13 |
| A3 | 845.48 | B3 | 854.65 |
| A4 | 828.81 | B4 | 802.19 |
| A5 | 867.63 | B5 | 855.04 |
| A6 | 875.06 | B6 | 869.10 |
| A7 | 843.68 | B7 | 832.30 |
| C1 | 498.26 | D1 | 503.74 |
| C2 | 121.00 | D2 | 86.50 |

As shown in Table 1 and Table 2, the metal-resin composite according to some embodiments of the present disclosure was formed with a unique pore structure, also referred as the three-dimensional pore structure having three porous layers on a surface of the metal substrate, and the adhesion force between the aluminum alloy and the resin layer was improved to as high as more than 800N. And the method for preparing the metal-resin composite is simplified, thus the metal-resin composition will be produced in large scale and applied in a wide range of application. Moreover, as shown in FIG. 1, the temperature of the etching solution shows very slow increases, indicating that heat release during the process of preparing the metal-resin composition is less, making it more suitable for large scale production. Further, the amount requirement for etching solution is less, and the corrosion to equipment is small.

Example 21

The method of preparing a metal-resin composite comprised the following steps:

1) Pretreatment

A commercially available aluminum alloy substrate (series 6063) having a thickness of 1 mm was cut into 15 mm*80 mm rectangular pieces. Then these pieces of aluminum alloy plate were polished with a polishing machine. After being polished, these pieces of aluminum alloy plate were washed to remove oil. Then, these pieces of aluminum alloy plate were etched in a sodium hydroxide solution having a concentration of 40 g/L and a temperature of 60 Celsius degrees for 10 seconds and then removed from the sodium hydroxide solution and washed with water. These cleaned pieces of aluminum alloy plate were immersed in a 6 wt % $HNO_3$ solution for 30 seconds in a neutralizing tank, and then removed from the $HNO_3$ solution and washed with water.

2) Surface Treatment 1

These pieces of aluminum alloy plate after the step 1) were immersed in a $H_2SO_4$ solution having a concentration of 20 wt % for 5 minutes under a voltage of 15 Volts and a temperature of 18 Celsius degrees in an anodic oxidation tank, and then removed from the $H_2SO_4$ solution and dried at a temperature of 80 Celsius degrees for 20 minutes to obtain aluminum alloy substrates.

3) Surface Treatment 2

A 500 milliliters hydrochloric acid solution having a concentration of 10 wt % was prepared in a beaker. The hydrochloric acid solution was heated to 25 Celsius degrees in a thermostatic bath. Then 10 pieces of aluminum alloy substrate after the step 2) were immersed in the hydrochloric acid solution for 2 minutes, and then removed from the hydrochloric acid solution and immersed in a beaker containing water for 2 minutes as a cycle. Then the cycle was repeated for 5 times. After the last time that the these aluminum alloy substrates were immersed in the beaker containing water for 2 minutes, these pieces of aluminum alloy substrate were dried in a drying oven at 80 Celsius degrees.

These pieces of aluminum alloy substrate after the step 3) were tested with a metallographic microscope and a field emission scanning electron microscope. The results indicated that the aluminum alloy substrate was formed with a first layer having a thickness ranging from about 100 nanometers to about 30 microns, a second layer having a thickness ranging from about 80 nanometers to about 100 nanometers and a third layer having a thickness ranging from about 6 microns to about 7 microns.

These pieces of aluminum alloy substrate after the step 3) were tested with a field emission scanning electron microscope. The results indicated that the third layer had third pores having an average diameter ranging from about 15 nanometers to about 30 microns; the second layer had second pores having an average diameter ranging from about 20 nanometers to about 25 microns and the first layer had first pores having an average diameter ranging from about 30 nanometers to about 100 microns. And a unique three-dimensional pore structure having three porous layers was observed, and the first pore, the second pore, and the third pore were communicated with each other.

4) Molding

These pieces of aluminum alloy substrate after the step 3) were divided into two groups, each group comprising 5 pieces. The two groups were inserted in an injection mold, with one group injected with PPS resin composition comprising 30 wt % of glass fiber, while the other group injected with nylon. Then the two groups were demoded and cooled, obtaining a metal-resin composite group A21 and a metal-resin composite group B21.

Example 22

The method for preparing a metal-resin composite of Example 22 comprised substantially the same steps as Example 21, with the following differences: in the step 3), a 500 milliliters hydrochloric acid solution having a concentration of 10 wt % was prepared in a beaker, the hydrochloric acid solution was heated to 25 Celsius degrees in a thermostatic bath, then 10 pieces of aluminum alloy substrate after the step 2) were immersed in the hydrochloric acid solution for 10 minutes, and then removed from the hydrochloric acid solution and immersed in a beaker containing water for 2 minutes, then these pieces of aluminum alloy substrate were dried in a drying oven at 80 Celsius degrees. A metal-resin composite group A22 and a metal-resin composite group B22 were obtained.

The results indicated that the aluminum alloy substrate was formed with a first layer having a thickness ranging from about 200 nanometers to about 50 microns, a second layer having a thickness ranging from about 80 nanometers to about 100 nanometers and a third layer having a thickness ranging from about 5 microns to about 5.5 microns. And the third layer had third pores having an average diameter ranging from about 20 nanometers to about 50 um; the second layer had second pores having an average diameter ranging from about 25 nanometers to about 50 microns and the first layer had first pores having an average diameter ranging from about 50 nanometers to about 150 microns. And a unique three-dimensional pore structure having three porous layers was observed, and the first pore, the second pore, and the third pore were communicated with each other.

Example 23

The method for preparing a metal-resin composite of Example 23 comprised substantially the same steps as in Example 21, with the following difference: in the step 3), the hydrochloric acid solution had a concentration of 5 wt %. A metal-resin composite group A23 and a metal-resin composite group B23 were obtained.

The results indicated that the aluminum alloy substrate was formed with a third layer having a thickness ranging from about 7 microns to about 8 microns, a second layer having a thickness ranging from about 80 nanometers to about 100 nanometers and a first layer having a thickness ranging from about 50 nanometers to about 15 micron. And the third layer had third pores having an average diameter ranging from about 15 nanometers to about 10 microns; the second layer had second pores having an average diameter ranging from about 20 nanometers to about 15 microns and the first layer had first pores having an average diameter ranging from about 30 nanometers to about 50 microns. And a unique three-dimensional pore structure having three porous layers was observed, and the first pore, the second pore, and the third pore were communicated with each other.

Example 24

The method for preparing a metal-resin composite of Example 24 comprised substantially the same steps as Example 21, with the following difference: in the step 3), the hydrochloric acid solution had a concentration of 15 wt %. A metal-resin composite group A24 and a metal-resin composite group B24 were obtained.

The results indicated that the aluminum alloy substrate was formed with a third layer having a thickness ranging from about 4 microns to about 5 microns, a second layer having a thickness ranging from about 80 nanometers to about 100 nanometers and a first layer having a thickness ranging from about 150 nanometers to about 60 microns. And the third layer had third pores having an average diameter ranging from about 25 nanometers to about 60 microns; the second layer had second pores having an average diameter ranging from about 30 nanometers to about 60 microns and the first layer had first pores having an average diameter ranging from about 50 nanometers to about 200 micron. And a unique three-dimensional pore which comprises three layers of pore is observed, and the first pore, the second pore and the third pore are communicated with each other.

Example 25

The method for preparing a metal-resin composite of Example 25 comprises substantially the same steps as Example 21, with the following differences: prior to step 4) and after step 3), these pieces of aluminum alloy substrate were immersed in a 2 wt % polyvinyl alcohol solution for 5 minutes, and then removed from polyvinyl alcohol solution and dried. A metal-resin composite group A25 and a metal-resin composite group B25 were obtained.

Example 26

1) Pretreatment

A commercially available aluminum alloy plate (series 6063) which has a thickness of 1 mm was cut into 15 mm*80 mm rectangular pieces. Then these pieces of aluminum alloy plate were polished with a polishing machine. After being polished, these pieces of aluminum alloy plate are washed to remove oil. Then, these pieces of aluminum alloy plate were etched in a sodium hydroxide solution having a concentration of 40 g/L and a temperature of 60 Celsius degrees for 10 seconds and then removed from the sodium hydroxide solution and washed with water. Then these cleaned pieces of aluminum alloy plate were immersed in a 6 wt % $HNO_3$ solution for 30 seconds in a neutralizing tank, and then removed from the $HNO_3$ solution and washed with water.

2) Surface Treatment 1

These pieces of aluminum alloy plate after the step 1) were immersed in a $H_2SO_4$ solution having a concentration of 20 wt % for 5 minutes under a voltage of 15 Volts and a temperature of 18 Celsius degrees in an anodic oxidation tank, and then removed from the $H_2SO_4$ solution and dried at a temperature of 80 Celsius degrees for 20 minutes.

3) Surface Treatment 2

A 500 milliliters hydrochloric acid solution having a concentration of 10 wt % was prepared in a beaker to act as an etching solution. The etching solution was heated to 25 Celsius degrees in a thermostatic bath, and a thermometer was placed in the thermostatic bath, with a measuring point of the thermometer located in middle of the hydrochloric acid solution. Then 20 pieces of these aluminum alloy substrates after the step 2) were divided into two groups, each group comprising 10 pieces. The first group of these aluminum alloy substrates was immersed in the hydrochloric acid solution for 2 minutes, and then removed from the hydrochloric acid solution and immersed in water. Before first group was removed from the hydrochloric acid solution, the temperature of the hydrochloric acid solution was recorded. Then second group of these aluminum alloy substrates was immediately immersed in the hydrochloric acid solution for 2 minutes. Before second group was removed from the hydrochloric acid solution, the temperature of the hydrochloric acid solution was recorded. After the second group was removed from the hydrochloric acid solution, the second group was immersed in water. As mentioned above, the process of immersing the first group in the hydrochloric acid solution, removing the first group from the hydrochloric acid solution, immersing the first group in water, immersing the second group in the hydrochloric acid solution, removing the second group from the hydrochloric acid solution, and immersing the second group in water was considered as a cycle. The cycle was repeated for 5 times, each time before these aluminum alloy substrates were removed from the etching solution, the temperature of the etching solution was recorded. The result was shown in the diagram of FIG. 2, which indicates the temperature changes of the hydrochloric acid solution with time.

Comparative Example 21

1) Pretreatment

A commercially available aluminum alloy plate (series 6063) which has a thickness of 1 mm was cut into 15 mm*80 mm rectangular pieces. Then these pieces of aluminum alloy plate were polished with a polishing machine. After being polished, these pieces of aluminum alloy plate were washed to remove oil. Then, these pieces of aluminum alloy plate were etched in a sodium hydroxide solution having a concentration of 40 g/L and at a temperature of 60 Celsius degrees for 10 seconds and then removed from the sodium hydroxide solution and washed with water. Then these cleaned pieces of aluminum alloy plate were immersed in a 6 wt % $HNO_3$ solution for 30 seconds in a neutralizing tank, and then removed from the $HNO_3$ solution and washed with water.

2) Surface Treatment

A 500 milliliters hydrochloric acid solution which has a concentration of 10 wt % was prepared in a beaker. The hydrochloric acid solution was heated to 25 Celsius degrees in a thermostatic bath. Then 10 pieces of aluminum alloy plate after the step 1) were immersed in the hydrochloric acid solution for 2 minutes, and then removed from the hydrochloric acid solution and immersed in a beaker containing water for 2 minutes as a cycle. Then the cycle was repeated for 5 times. After the last time that these aluminum alloy plates were immersed in the beaker containing water for 2 minutes, these pieces of aluminum alloy plate were dried in a drying oven at 80 Celsius degrees.

These pieces of aluminum alloy substrate after the step 2) were tested with a metallographic microscope and a field emission scanning electron microscope. The results indicated that the aluminum alloy substrate was formed with a first layer having a thickness ranging from about 200 nanometers to about 100 microns.

These pieces of aluminum alloy substrate after the step 2) were tested with a field emission scanning electron microscope. The results indicated that the first layer had first pores having an average diameter ranging from about 100 nanometers to about 500 microns.

3) Molding

These pieces of aluminum alloy substrate after the step 2) were divided into two groups, each group comprising 5 pieces. The two groups were inserted in an injection mould, with one group injected with PPS resin composition comprising 30 wt % of glass fiber, while the other group injected with nylon. Then the two groups were demoded and cooled, obtaining a metal-resin composite group C21 and a metal-resin composite group D21.

Comparative Example 22

1) Pretreatment

A commercially available aluminum alloy plate (series 6063) which has a thickness of 1 mm was cut into 15 mm*80 mm rectangular pieces. Then these pieces of aluminum alloy plate were polished with a polishing machine. After being polished, these pieces of aluminum alloy plate were washed to remove oil. Then, these pieces of aluminum alloy plate were etched in a sodium hydroxide solution having a concentration of 40 g/L and at a temperature of 60 Celsius degrees for 10 seconds and then removed from the sodium hydroxide solution and washed with water. Then these cleaned pieces of aluminum alloy plate were immersed in a 6 wt % $HNO_3$ solution for 30 seconds in a neutralizing tank, and then removed from the $HNO_3$ solution and washed with water.

2) Surface Treatment

These pieces of aluminum alloy plate after the step 1) were immersed in a $H_2SO_4$ solution having a concentration of 20 wt % for 5 minutes under a voltage of 15 Volts in an anodic oxidation tank, and then removed from the $H_2SO_4$ solution and blown to dry these aluminum alloy plates.

These pieces of aluminum alloy substrate after the step 2) were tested with a metallographic microscope and a field emission scanning electron microscope. The results indicated that the aluminum alloy substrate was formed with a first layer having a thickness ranging from about 9 microns to about 10 microns.

These pieces of aluminum alloy substrate after the step 2) were tested with a field emission scanning electron microscope. The results indicated that the first layer had first pores having an average diameter ranging from about 10 nanometers to about 100 nanometers.

3) Molding

These pieces of aluminum alloy substrate after the step 2) were divided into two groups, each group comprising 5 pieces. The two groups were inserted in an injection mold, with one group injected with PPS resin composition comprising 30 wt % of glass fiber, while the other group injected with nylon. Then the two groups were demoded and cooled, obtaining a metal-resin composite group C22 and a metal-resin composite group D22.

Comparative Example 23

1) Pretreatment

A commercially available aluminum alloy plate (series 6063) which has a thickness of 1 mm was cut into 15 mm*80 mm rectangular pieces. Then these pieces of aluminum alloy plate were polished with a polishing machine. After being polished, these pieces of aluminum alloy plate were washed to remove oil. Then, these pieces of aluminum alloy plate were etched in a sodium hydroxide solution having a concentration of 40 g/L and a temperature of 60 Celsius degrees for 10 seconds and then removed from the sodium hydroxide solution and washed with water. Then these cleaned pieces of aluminum alloy plate were immersed in a 6 wt % $HNO_3$ solution for 30 seconds in a neutralizing tank, and then removed from the $HNO_3$ solution and washed with water.

2) Surface Treatment

A 500 milliliters hydrochloric acid solution having a concentration of 10 wt % was prepared in a beaker to act as an etching solution. The etching solution was heated to 25 Celsius degrees in a thermostatic bath, and a thermometer was placed in the thermostatic bath, with a measuring point of the thermometer located in middle of the etching solution. Then 20 pieces of aluminum alloy plate after the step 1) were divided into two groups, each group comprising 10 pieces. The first group of these aluminum alloy substrates was immersed in the etching solution for 2 minutes, and then removed from the etching solution and immersed in water. Before the first group was removed from the etching solution, the temperature of the etching solution was recorded. Then the second group of these aluminum alloy substrates was immediately immersed in the etching solution for 2 minutes. Then the second group was removed from the etching solution. Before the second group was removed from the etching solution, the temperature of the etching solution was recorded. Then the second group was immersed in a beaker containing water. The process of immersing the first group in the etching solution, removing the first group from the etching solution, immersing the first group in water, immersing the second group in the etching solution, removing the second group from the etching solution, and immersing the first group in the etching solution was considered as a cycle. The cycle was repeated for 5 times, each time before the aluminum alloy substrate was removed from the etching solution the temperature of the etching solution was recorded. The results were shown in FIG. 2.

Performance Test

These metal-resin composite groups A21-A25 and C21, C22 were tested with a universal material testing machine. The maximum load of the test results may be referred as an adhesion force between the aluminum alloy and the resin composition. The test results are shown in Table 4.

TABLE 3

| | Thickness of third layer | Average pore diameter of third pore | Thickness of second layer | Average pore diameter of second pore | Thickness of first layer | Average pore diameter of first pore |
|---|---|---|---|---|---|---|
| Example 21 | 6-7 um | 15 nm-30 um | 80-100 nm | 20 nm-25 um | 100 nm-30 um | 30 nm-100 um |
| Example 22 | 5-5.5 um | 20 nm-50 um | 80-100 nm | 25 nm-50 um | 200 nm-50 um | 50 nm-150 um |
| Example 23 | 7-8 um | 15 nm-10 um | 80-100 nm | 20 nm-15 um | 50 nm-15 um | 30 nm-50 um |
| Example 24 | 4-5 um | 25 nm-60 um | 80-100 nm | 30 nm-60 um | 150 nm-60 um | 50 nm-200 um |

TABLE 4

| Example | Adhesion force/N | Example | Adhesion force/N |
|---|---|---|---|
| A21 | 828.81 | B21 | 802.19 |
| A22 | 722.09 | B22 | 715.98 |
| A23 | 564.20 | B23 | 519.32 |
| A24 | 865.94 | B24 | 817.38 |
| A25 | 886.28 | B25 | 846.95 |
| C21 | 698.26 | D21 | 603.74 |
| C22 | 121.00 | D22 | 86.50 |

As shown in Table 3 and Table 4, the metal-resin composite according to some embodiments of the present disclosure was formed with a unique pore structure, also referred as the three-dimensional pore structure having three porous layers on a surface of the metal substrate, and the adhesion force between the aluminum alloy and the resin layer was improved to as high as more than 800N. And the method for preparing the metal-resin composite is simplified, thus the metal-resin composition will be produced in large scale and applied in a wide range of application.

Figure 2:
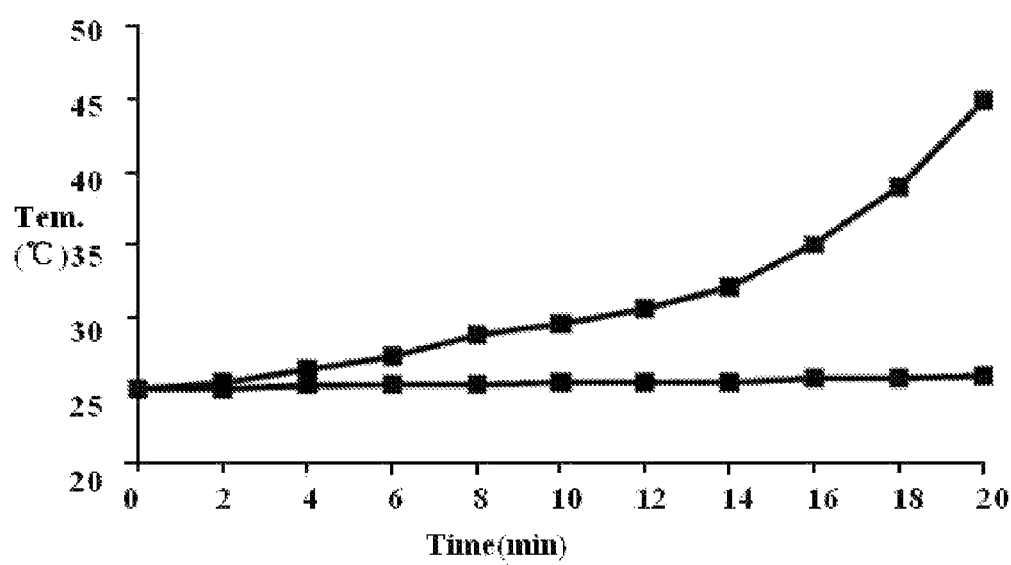
FIG. 2 is a diagram showing temperature changes of the etching solution of example 26 according to an embodiment of the present disclosure and comparative example 23.

Moreover, as shown in FIG. 2, the temperature of the etching solution shows very slow increases, indicating that heat release during the process of preparing the metal-resin composition is less, making it more suitable for large scale production. Further, the amount requirement for etching solution is less, and the corrosion to equipment is small.

Example 31

The method of preparing a metal-resin composite comprised the following steps:

1) Pretreatment

A commercially available aluminum alloy plate (series 6063) which has a thickness of 1 mm was cut into 15 mm*80 mm rectangular pieces. Then these pieces of aluminum alloy plate were polished with a polishing machine. After being polished, these pieces of aluminum alloy plate are washed to remove oil. Then, these pieces of aluminum alloy plate were etched in a sodium hydroxide solution having a concentration of 40 g/L and a temperature of 60 Celsius degrees for 10 seconds and then removed from the sodium hydroxide solution and washed with water. These cleaned pieces of aluminum alloy plate were immersed in a 6 wt % $HNO_3$ solution for 30 seconds in a neutralizing tank, and then removed from the $HNO_3$ solution and washed with water.

2) Surface Treatment 1

These pieces of aluminum alloy plate after the step 1) were immersed in a $H_2SO_4$ solution having a concentration of 15 wt % for 5 minutes under a voltage of 15 Volts and a temperature of 18 Celsius degrees in an anodic oxidation tank, and then removed from the $H_2SO_4$ solution and dried at a temperature of 80 Celsius degrees for 20 minutes.

3) Surface Treatment 2

A 500 milliliters phosphoric acid solution having a concentration of 10 wt % was prepared in a beaker under room temperature. Then 10 pieces of aluminum alloy substrate after the step 2) were immersed in the phosphoric acid solution for 2 minutes, and then removed from the phosphoric acid solution and immersed in a beaker containing water for 2 minutes as a cycle. Then the cycle was repeated for 2 times. After the last time that the these aluminum alloy substrates were immersed in the beaker containing water for 2 minutes, these pieces of aluminum alloy substrate were dried in a drying oven at 80 Celsius degrees.

These pieces of aluminum alloy substrate after the step 3) were tested with a metallographic microscope and a field emission scanning electron microscope. The results indicated that the aluminum alloy substrate was formed with a first layer having a thickness ranging from about 20 nanometers to about 40 microns, a second layer having a thickness ranging from about 80 nanometers to about 110 nanometers and a third layer having a thickness ranging from about 6 microns to about 6.5 microns.

These pieces of aluminum alloy substrate after the step 3) were tested with a field emission scanning electron microscope. The results indicated that the third layer had third pores having an average diameter ranging from about 20 nanometers to about 20 microns; the second layer had second pores having an average diameter ranging from about 25 nanometers to about 25 microns and the first layer had first pores having an average diameter ranging from about 50 nanometers to about 120 microns. And a unique three-dimensional pore structure having three porous layers was observed, and the first pore, the second pore, and the third pore were communicated with each other.

4) Molding

These pieces of aluminum alloy substrate after the step 3) were divided into two groups, each group comprising 5 pieces. The two groups were inserted in an injection mould, with one group injected with nylon, while the other group injected with PPS resin composition comprising 30 wt % of glass fiber. Then the two groups were demoded and cooled, obtaining a metal-resin composite group A31 and a metal-resin composite group B31.

Example 32

The method for preparing a metal-resin composite of Example 32 comprised substantially the same steps as Example 31, with the following differences: in the step 3), a 500 milliliters phosphoric acid solution having a concentration of 10 wt % was prepared in a beaker under room temperature, then 10 pieces of aluminum alloy substrate after the step 2) were immersed in the phosphoric acid solution for 10 minutes, and then removed from the phosphoric acid solution and immersed in a beaker containing water for 2 minutes, then these pieces of aluminum alloy substrate were dried in a drying oven at 80 Celsius degrees. A metal-resin composite group A32 and a metal-resin composite group B32 were obtained.

The results indicated that the aluminum alloy substrate was formed with a first layer having a thickness ranging from about 25 nanometers to about 50 microns, a second layer having a thickness ranging from about 75 nanometers to about 100 nanometers and a third layer having a thickness ranging from about 5 microns to about 6 microns. And the third layer had third pores having an average diameter ranging from about 30 nanometers to about 45 um; the second layer had second pores having an average diameter ranging from about 30 nanometers to about 50 microns and the first layer had first pores having an average diameter ranging from about 60 nanometers to about 200 microns. And a unique three-dimensional pore structure having three porous layers was observed, and the first pore, the second pore, and the third pore were communicated with each other.

Example 33

The method for preparing a metal-resin composite of Example 33 comprised substantially the same steps as Example 31, with the following difference: in the step 3), the phosphoric acid solution had a concentration of 5 wt %. A metal-resin composite group A33 and a metal-resin composite group B33 were obtained.

The results indicated that the aluminum alloy substrate was formed with a third layer having a thickness ranging from about 7 microns to about 7.5 microns, a second layer having a thickness ranging from about 80 nanometers to about 100 nanometers and a first layer having a thickness ranging from about 15 nanometers to about 25 micron. And the third layer had third pores having an average diameter ranging from about 15 nanometers to about 10 microns; the second layer had second pores having an average diameter ranging from about 20 nanometers to about 15 microns and the first layer had first pores having an average diameter ranging from about 40 nanometers to about 60 microns. And a unique three-dimensional pore structure having three porous layers was observed, and the first pore, the second pore, and the third pore were communicated with each other.

Example 34

The method for preparing a metal-resin composite of Example 34 comprised substantially the same steps as Example 31, with the following difference: in the step 3), the phosphoric acid solution had a concentration of 20 wt %. A metal-resin composite group A34 and a metal-resin composite group B34 were obtained.

The results indicated that the aluminum alloy substrate was formed with a third layer having a thickness ranging from about 3 microns to about 4 microns, a second layer having a thickness ranging from about 80 nanometers to about 100 nanometers and a first layer having a thickness ranging from about 30 nanometers to about 80 microns. And the third layer had third pores having an average diameter ranging from about 30 nanometers to about 60 microns; the second layer had second pores having an average diameter ranging from about 40 nanometers to about 80 microns and the first layer had first pores having an average diameter ranging from about 80 nanometers to about 300 micron. And a unique three-dimensional pore which comprises three layers of pore is observed, and the first pore, the second pore and the third pore are communicated with each other.

Example 35

The method for preparing a metal-resin composite of Example 35 comprised substantially the same steps as Example 31, with the following difference: in the step 3), a 500 milliliters etching solution which comprises 10 wt % of phosphoric acid and 1 wt % of sodium chloride was prepared in a beaker. A metal-resin composite group A35 and a metal-resin composite group B35 were obtained.

The results indicated that the aluminum alloy substrate was formed with a third layer having a thickness ranging from about 4.5 microns to about 5 microns, a second layer having a thickness ranging from about 80 nanometers to about 100 nanometers and a first layer having a thickness ranging from about 25 nanometers to about 60 microns. And the third layer had third pores having an average diameter ranging from about 25 nanometers to about 50 microns; the second layer had second pores having an average diameter ranging from about 30 nanometers to about 50 microns and the first layer had first pores having an average diameter ranging from about 50 nanometers to about 250 micron. And a unique three-dimensional pore structure having three porous layers was observed, and the first pore, the second pore, and the third pore were communicated with each other.

Example 36

The method for preparing a metal-resin composite of Example 36 comprised substantially the same steps as Example 31, with the following difference: prior to step 4) and after step 3), these pieces of aluminum alloy substrate were immersed in a 2 wt % polyvinyl alcohol solution for 5 minutes, and then removed from polyvinyl alcohol solution and dried. A metal-resin composite group A36 and a metal-resin composite group B36 were obtained.

Example 37

1) Pretreatment

A commercially available aluminum alloy plate (series 6063) which has a thickness of 1 mm was cut into 15 mm*80 mm rectangular pieces. Then these pieces of aluminum alloy plate were polished with a polishing machine. After being polished, these pieces of aluminum alloy plate were washed to remove oil of aluminum alloy plate. Then, these pieces of aluminum alloy plate were etched in a sodium hydroxide solution having a concentration of 40 g/L and a temperature of 60 Celsius degrees for 10 seconds and then removed from the sodium hydroxide solution and washed with water. Then these cleaned pieces of aluminum alloy plate were immersed in a 6 wt % $HNO_3$ solution for 30 seconds in a neutralizing tank, and then removed from the $HNO_3$ solution and washed with water.

2) Surface Treatment 1

These pieces of aluminum alloy plate after the step 1) were immersed in a $H_2SO_4$ solution having a concentration of 15 wt % for 5 minutes under a voltage of 15 Volts and a temperature of 18 Celsius degrees in an anodic oxidation tank, and then removed from the $H_2SO_4$ solution and dried at a temperature of 80 Celsius degrees for 20 minutes.

3) Surface Treatment 2

A 500 milliliters phosphoric acid solution having a concentration of 10 wt % was prepared in a beaker. The etching solution was heated to 25 Celsius degrees in a thermostatic bath, and a thermometer was placed in the thermostatic bath, with a measuring point of the thermometer located in middle of the phosphoric acid solution. Then 20 pieces of these aluminum alloy substrates after the step 2) were divided into two groups, each group comprising 10 pieces. The first group of these aluminum alloy substrates was immersed in the phosphoric solution for 2 minutes, and then removed from the phosphoric solution and immersed in water. Before the first group was removed from the phosphoric solution, a temperature of the phosphoric solution was recorded. Then the second group of these aluminum alloy substrates was immersed immediately in the phosphoric solution for 2 minutes. Before the second group was removed from the phosphoric solution, a temperature of the phosphoric solution was recorded. After the second group was removed from the phosphoric solution, the second group was immersed in water. As mentioned above, the process of immersing the first group in the phosphoric solution, removing the first group from the phosphoric solution, immersing the first d group in water, immersing the second group in the phosphoric solution, removing the second group from the phosphoric solution, and immersing the second group in water was considered as a cycle. The cycle was repeated for 5 times, each time before these aluminum alloy substrates are removed from the phosphoric solution, the temperature of the phosphoric solution was recorded. The result was shown in the diagram of FIG. 3, which indicates the temperature changes of the phosphoric solution with time.

Comparative Example 31

1) Pretreatment

A commercially available aluminum alloy plate (series 6063) which has a thickness of 1 mm was cut into 15 mm*80 mm rectangular pieces. Then these pieces of aluminum alloy plate were polished with a polishing machine. After being polished, these pieces of aluminum alloy plate were washed to remove oil. Then, these pieces of aluminum alloy plate were etched in a sodium hydroxide solution having a concentration of 40 g/L and at a temperature of 60 Celsius degrees for 10 seconds and then removed from the sodium hydroxide solution and washed with water. Then these washed pieces of aluminum alloy plate were immersed in a 6 wt % $HNO_3$ solution for 30 seconds in a neutralizing tank, and then removed from the $HNO_3$ solution and washed with water.

2) Surface Treatment

A 500 milliliters phosphoric acid solution which has a concentration of 10 wt % was prepared in a beaker. The phosphoric acid solution was heated to 25 Celsius degrees in a thermostatic bath. Then 10 pieces of aluminum alloy plate after the step 1) were immersed in the phosphoric acid solution for 2 minutes, and then removed from the phosphoric acid solution and immersed in a beaker containing water for 2 minutes as a cycle. Then the cycle was repeated for 5 times. After the last time that these aluminum alloy plates were immersed in the beaker containing water for 2 minutes, these pieces of aluminum alloy plate were dried in a drying oven at 80 Celsius degrees.

These pieces of aluminum alloy substrate after the step 2) were tested with a metallographic microscope and a field emission scanning electron microscope. The results indicated that the aluminum alloy substrate was formed with a first layer having a thickness ranging from about 300 nanometers to about 120 microns.

These pieces of aluminum alloy substrate after the step 2) were tested with a field emission scanning electron microscope. The results indicated that the first layer had first pores having an average diameter ranging from about 300 nanometers to about 400 microns.

3) Molding

These pieces of aluminum alloy substrate after the step 2) were divided into two groups, each group comprising 5 pieces. The two groups were inserted in an injection mould, with one group injected with PPS resin composition comprising 30 wt % of glass fiber, while the other group injected with nylon. Then the two groups were demoded and cooled, obtaining a metal-resin composite group C31 and a metal-resin composite group D31.

Comparative Example 32

1) Pretreatment

A commercially available aluminum alloy plate (series 6063) which has a thickness of 1 mm was cut into 15 mm*80 mm rectangular pieces. Then these pieces of aluminum alloy plate were polished with a polishing machine. After being polished, these pieces of aluminum alloy plate were washed to remove oil. Then, these pieces of aluminum alloy plate were etched in a sodium hydroxide solution having a concentration of 40 g/L and at a temperature of 60 Celsius degrees for 10 seconds and then removed from the sodium hydroxide solution and washed with water. Then these washed pieces of aluminum alloy plate were immersed in a 6 wt % $HNO_3$ solution for 30 seconds in a neutralizing tank, and then removed from the $HNO_3$ solution and washed with water.

2) Surface Treatment

These pieces of aluminum alloy plate after the step 1) were immersed in a $H_2SO_4$ solution having a concentration of 20 wt % for 10 minutes under a voltage of 15 Volts in an anodic oxidation tank, and then removed from the $H_2SO_4$ solution and blown to dry these aluminum alloy plates.

These pieces of aluminum alloy substrate after the step 2) were tested with a metallographic microscope and a field emission scanning electron microscope. The results indicated that the aluminum alloy substrate was formed with a first layer having a thickness ranging from about 9 microns to about 10 microns.

These pieces of aluminum alloy substrate after the step 2) were tested with a field emission scanning electron microscope. The results indicated that the first layer had first pores having an average diameter ranging from about 10 nanometers to about 100 nanometers.

3) Molding

These pieces of aluminum alloy substrate after the step 2) were divided into two groups, each group comprising 5 pieces. The two groups were inserted in an injection mold, with one group injected with PPS resin composition comprising 30 wt % of glass fiber, while the other group injected with nylon. Then the two groups were demoded and cooled, obtaining a metal-resin composite group C32 and a metal-resin composite group D32.

ing the second group from the etching solution, and immersing the second group in water was considered as a cycle. The cycle was repeated for 5 times, each time before these aluminum alloy substrates are removed from the etching solution, the temperature of the etching solution was recorded. The result was shown in the diagram of FIG. 3, which indicates the temperature changes of the etching solution with time.

Performance Test

These metal-resin composite groups A31-A36 and C31, C32 were tested with a universal material testing machine. The maximum load of the test results may be referred as an adhesion force between the aluminum alloy and the resin composition. The results are shown in Table 6.

TABLE 5

|  | Thickness of third layer | Average pore diameter of third pore | Thickness of second layer | Average pore diameter of second pore | Thickness of first layer | Average pore diameter of first pore |
|---|---|---|---|---|---|---|
| Example 31 | 6-6.5 um | 20 nm-20 um | 80-110 nm | 25 nm-25 um | 20 nm-40 um | 50 nm-120 um |
| Example 32 | 5-6 um | 30 nm-45 um | 75-100 nm | 30 nm-50 um | 25 nm-50 um | 60 nm-200 um |
| Example 33 | 7-7.5 um | 15 nm-10 um | 80-100 nm | 20 nm-15 um | 15 nm-25 um | 40 nm-60 um |
| Example 34 | 3-4 um | 30 nm-60 um | 80-100 nm | 40 nm-80 um | 30 nm-80 um | 80 nm-300 um |
| Example 35 | 4.5-5 um | 25 nm-50 um | 80-100 nm | 30 nm-50 um | 25 nm-60 um | 50 nm-250 um |

Comparative Example 33

1) Pretreatment

A commercially available aluminum alloy plate (series 6063) which has a thickness of 1 mm was cut into 15 mm*80 mm rectangular pieces. Then these pieces of aluminum alloy plate were polished with a polishing machine. After being polished, these pieces of aluminum alloy plate were washed to remove oil. Then, these pieces of aluminum alloy plate were etched in a sodium hydroxide solution having a concentration of 40 g/L and a temperature of 60 Celsius degrees for 10 seconds and then removed from the sodium hydroxide solution and washed with water. Then these washed pieces of aluminum alloy plate were immersed in a 6 wt % $HNO_3$ solution for 30 seconds in a neutralizing tank, and then removed from the $HNO_3$ solution and washed with water.

2) Surface Treatment

A 500 milliliters phosphoric acid solution having a concentration of 10 wt % was prepared in a beaker to act as an etching solution. The etching solution was heated to 25 Celsius degrees in a thermostatic bath, and a thermometer was placed in the thermostatic bath, with a measuring point of the thermometer located in middle of the etching solution. Then 20 pieces of aluminum alloy plate after the step 1) were divided into two groups, each group comprising 10 pieces. The first group of these aluminum alloy substrates was immersed in the etching solution for 2 minutes, and then removed from the etching solution and immersed in water. Before the first group was removed from the etching solution, a temperature of the etching solution was recorded. Then the second group of these aluminum alloy substrates was immersed immediately in the etching solution for 2 minutes. Before the second group was removed from the etching solution, a temperature of the etching solution was recorded. After the second group was removed from the etching solution, the second group was immersed in water. As mentioned above, the process of immersing the first group in the etching solution, removing the first group from the etching solution, immersing the first group in water, immersing the second group in the etching solution, remov-

TABLE 6

| Example | Adhesion force/N | Example | Adhesion force/N |
|---|---|---|---|
| A1 | 845.48 | B1 | 854.65 |
| A2 | 808.47 | B2 | 815.96 |
| A3 | 612.04 | B3 | 636.58 |
| A4 | 934.22 | B4 | 916.78 |
| A5 | 907.10 | B5 | 939.50 |
| A6 | 891.27 | B6 | 874.08 |
| C1 | 354.65 | D1 | 421.12 |
| C2 | 121.00 | D2 | 86.50 |

As shown in Table 5 and Table 6, the metal-resin composite according to some embodiments of the present disclosure was formed with a unique pore structure, also referred as the three-dimensional pore structure having three porous layers on a surface of the metal substrate, and the adhesion force between the aluminum alloy and the resin layer was improved to as high as more than 900N. And the method for preparing the metal-resin composite is simplified, thus the metal-resin composition will be produced in large scale and applied in a wide range of application.

Figure 3:
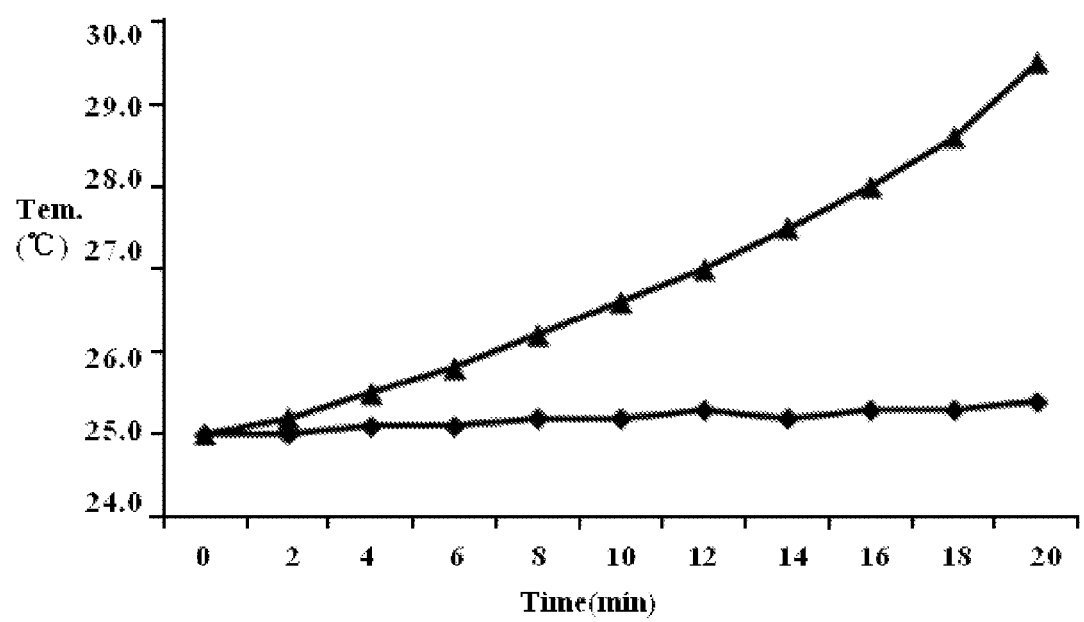
FIG. 3 is a diagram showing temperature changes of the etching solution of example 37 according to an embodiment of the present disclosure and comparative example 33.

Moreover, as shown in FIG. 3, the temperature of the etching solution shows very slow increases, indicating that heat release during the process of preparing the metal-resin composition is less, making it more suitable for large scale production. Further, the amount requirement for etching solution is less, and the corrosion to equipment is small.

Although explanatory Examples have been shown and described, it would be appreciated by those skilled in the art that the above Examples can not be construed to limit the present disclosure, and changes, alternatives, and modifications can be made in the Examples without departing from spirit, principles and scope of the present disclosure.

What is claimed is:

1. A method of preparing a metal composite, comprising:
providing a metal substrate comprising an anodic oxidation layer on a surface thereof, the metal substrate comprising a first layer, the anodic oxidation layer comprising a second layer in contact with the first layer and a third layer on the second layer, the third layer comprising at least one third pore, and the metal substrate comprising an aluminum alloy or aluminum; and immersing the metal substrate in an etching solution to form at least one first pore in the first layer and to form at least one second pore in the second layer.

2. The method according to claim 1, wherein the etching solution comprises H+, and the H+ has a concentration of about 0.55 mol/L to about 5.5 mol/L.

3. The method according to claim 2, wherein the etching solution further comprises $Cl^-$ and/or $PO_4^{3-}$.

4. The method according to claim 2, wherein the etching solution comprises a hydrochloric acid solution having a concentration ranging from about 2 wt % to about 20 wt %.

5. The method according to claim 2, wherein the etching solution comprises hydrochloric acid and a chloride, and
wherein, based on the total weight of the etching solution, the hydrochloric acid has a concentration ranging from about 2 wt % to about 20 wt %, and the chloride has a concentration ranging from about 1 wt % to about 20 wt %.

6. The method according to claim 2, wherein the etching solution comprises a phosphoric acid solution having a concentration ranging from about 3 wt % to about 40 wt %.

7. The method according to claim 6, wherein the etching solution further comprises an inorganic substance comprising a halogen.

8. The method according to claim 7, wherein the inorganic substance comprises a soluble hydrochloride.

9. The method according to claim 8, wherein the soluble hydrochloride comprises at least one selected from the group consisting of sodium chloride, potassium chloride, and aluminum chloride.

10. The method according to claim 9, wherein, based on the weight of the phosphoric acid solution, the soluble hydrochloride has a concentration ranging from about 0.01 wt % to about 10 wt %.

11. The method according to claim 2, wherein the etching solution comprises phosphoric acid and a phosphate, and wherein, based on the total weight of the etching solution, the phosphoric acid has a concentration ranging from about 3 wt % to about 30 wt %, and the phosphate has a concentration ranging from about 1 wt % to about 20 wt %.

12. The method according to claim 1, wherein the immersing step is carried out at a temperature ranging from about 18 Celsius degrees to about 35 Celsius degrees for about 1 minute to about 60 minutes.

13. The method according to claim 1 further comprising:
injection molding a resin composition to form a resin layer on a surface of the metal composite.

14. The method according to claim 13, further comprising:
modifying the metal composite by immersing the metal composite in a water-soluble polymer solution prior to the injection molding step.

15. The method according to claim 14, wherein the modifying step is carried out at a temperature ranging from about 15 Celsius degrees to about 60 Celsius degrees for about 1 minute to about 30 minutes.

16. The method according to claim 14, further comprising:
drying the metal composite between the modifying step and the injection molding step.

17. The method according to claim 13, wherein the injection molding step is carried out under a condition of: a mold temperature ranging from about 50 Celsius degrees to about 300 Celsius degrees, a nozzle temperature ranging from about 200 Celsius degrees to about 450 Celsius degrees, a pressure maintaining time ranging from about 1 second to about 50 seconds, an injection pressure ranging from about 50 MPa to about 300 MPa, an injection time ranging from about 1 second to about 30 seconds, a time delay ranging from about 1 second to about 30 seconds, and a cooling time ranging from about 1 second to about 60 seconds.

18. The method according to claim 13, wherein the resin layer has a thickness ranging from about 0.5 millimeter to about 10 millimeters.

* * * * *